US008311400B2

(12) United States Patent
Sasaki

(10) Patent No.: US 8,311,400 B2
(45) Date of Patent: Nov. 13, 2012

(54) CONTENT REPRODUCTION APPARATUS AND CONTENT REPRODUCTION METHOD

(75) Inventor: Takamitsu Sasaki, Osaka (JP)

(73) Assignee: Panasonic Corporation, Osaka (JP)

( * ) Notice: Subject to any disclaimer, the term of this patent is extended or adjusted under 35 U.S.C. 154(b) by 209 days.

(21) Appl. No.: 12/997,036

(22) PCT Filed: Jun. 11, 2009

(86) PCT No.: PCT/JP2009/002635

§ 371 (c)(1), (2), (4) Date: Dec. 9, 2010

(87) PCT Pub. No.: WO2009/150841

PCT Pub. Date: Dec. 17, 2009

(65) Prior Publication Data

US 2011/0091184 A1 Apr. 21, 2011

(30) Foreign Application Priority Data

Jun. 12, 2008 (JP) ................................ 2008-154473

(51) Int. Cl.
*H04N 5/93* (2006.01)
*H04N 5/765* (2006.01)

(52) U.S. Cl. ....................................... 386/353; 386/200

(58) Field of Classification Search ........................ None
See application file for complete search history.

(56) References Cited

U.S. PATENT DOCUMENTS 5,993,318 A 11/1999 Kousaki
2005/0220309 A1* 10/2005 Hirata et al. .................... 381/18
2006/0125968 A1 6/2006 Yokozawa et al.
2007/0076905 A1 4/2007 Konagai et al.
2007/0097265 A1 5/2007 Yoshikawa et al.
2007/0116306 A1 5/2007 Riedel et al.
2007/0165878 A1 7/2007 Konagai
(Continued)

FOREIGN PATENT DOCUMENTS

CN 1787605 6/2006
(Continued)

OTHER PUBLICATIONS

International Search Report mailed Jul. 7, 2009 in International (PCT) Application No. PCT/JP2009/002635.

*Primary Examiner* — William C Vaughn, Jr.
*Assistant Examiner* — Asher Khan
(74) *Attorney, Agent, or Firm* — Wenderoth, Lind & Ponack, L.L.P.

(57) ABSTRACT

A content reproduction apparatus (100), connected to a display and speakers, includes: a content display control unit (200) which can cause a first window (1101) and a second window (1201) to be displayed on the display; a sound output control unit (110) which can cause at least one speaker assigned for outputting sound of first content to output the sound of the first content, and can cause at least one speaker assigned for outputting sound of second content to output the sound of the second content; a viewable range calculation unit (150) which calculates, by calculation, a viewable range in which the first viewer is located and which is included in a predetermined range where the first viewer can hear the sound of the first content with a predetermined acoustic effect; and a display control unit which outputs, to provide to the first viewer, information based on the viewable range.

18 Claims, 21 Drawing Sheets

U.S. PATENT DOCUMENTS

2007/0211908 A1 9/2007 Van Reck
2008/0031473 A1 2/2008 Yarygin et al.
2010/0322435 A1* 12/2010 Suzuki et al. .................. 381/92

FOREIGN PATENT DOCUMENTS

| | | |
|---|---|---|
| CN | 1898988 | 1/2007 |
| CN | 1906972 | 1/2007 |
| CN | 101119596 | 2/2008 |
| JP | 09-166482 | 6/1997 |
| JP | 3482055 | 6/1997 |
| JP | 10-137445 | 5/1998 |
| JP | 2001-125695 | 5/2001 |
| JP | 2003-116074 | 4/2003 |
| JP | 2003-122374 | 4/2003 |
| JP | 2004-215781 | 8/2004 |
| JP | 2006-166295 | 6/2006 |
| JP | 2007-81584 | 3/2007 |
| JP | 2008-011253 | 1/2008 |
| WO | 2006/033074 | 3/2006 |

* cited by examiner

| Assignment table | | |
|---|---|---|
| Number of people | Viewer | Speaker |
| 1 | a | [1]、[2]、…、[n] |
| 2 | a | [1]、…、[m] |
| | b | [m+1]、…、[n] |
| ... | ... | ... |

CONTENT REPRODUCTION APPARATUS AND CONTENT REPRODUCTION METHOD

TECHNICAL FIELD

The present invention relates to a content reproduction apparatus which displays content on an extra-large screen display included in a content viewing system.

BACKGROUND ART

Conventionally, a content viewing system includes a content reproduction apparatus such as a digital versatile disc (DVD) player connected to a display and a speaker apparatus. In addition, content viewing is enjoyed using such a content viewing system.

Besides the configuration described above, there is another configuration such that an apparatus, such as a television set that is a display and doubles as a content reproduction apparatus, is connected to the speaker apparatus, and yet another configuration is such that a personal computer (PC), which is used for the content reproduction apparatus, is connected to the display and the speaker apparatus.

The content reproduction apparatus not only outputs moving images of the content to the display but also controls the speaker so that a viewer can hear, at a viewing position, the sound included in the content with a desired acoustic effect.

Patent Literature 1 discloses a conventional technique for controlling the speaker apparatus according to the position of the viewer when viewing the content (hereinafter, referred to as a "viewing position"), so as to allow the viewer to obtain the desired acoustic effect at the viewing position.

In addition, Patent Literature 2 discloses another technique for controlling the speaker apparatus in the content viewing system that allows plural viewers to view different content items, so as to allow such different viewers to obtain different desired acoustic effects.

[Citation List]

[Patent Literature]

[PTL1]: Japanese Unexamined Patent Application Publication No. 2006-166295

[PTL2]: Japanese Unexamined Patent Application Publication No. 2008-011253

SUMMARY OF INVENTION

[Technical Problem]

However, none of the conventional techniques described above has ever considered a point that such a viewing position includes a range that does not allow the content reproduction apparatus to reproduce the acoustic effect (for example, 5.1 ch surround) desired by the viewer. In other words, the conventional techniques described above do not consider that the range of the viewing position (hereinafter, referred to as a "viewing range") has a possibility of including a range that does not allow the desired acoustic effect to be reproduced.

This is because a conventional content viewing system, which uses an existing television or the like as a display, only requires some limited space, such as a room center, for the viewing range. Therefore, it has not been necessary to consider the possibility that the viewing range may include a range that does not allow the content reproduction apparatus to reproduce the acoustic effect desired by the viewer.

However, large screen televisions, mostly a plasma television and a liquid crystal television, are already widely used at homes. As a result, the size of the display used in the content viewing system is growing every year.

In addition, with consumer demands for a much larger display growing, a huge screen television sized over 100 inch has already appeared on the market. For example, given that a sample of a large wall screen television that uses an entire wall as a screen is exhibited, the size of the display used in the content viewing system is expected to grow further in the future.

In addition, almost the entire room is covered by the viewing range of the content viewing system using an extra-large screen display such as a large wall screen television. This means that the viewing range is to include, for example, a room corner, which is a range in which the content reproduction apparatus cannot reproduce the acoustic effect desired by the viewer.

In this case, as described earlier, since none of the conventional techniques described above has considered the presence of a viewing range that does not allow the content reproduction apparatus to reproduce the acoustic effect desired by the viewer, there is a problem that the viewer is unable to tell whether the viewer is located at a position that allows obtaining the desired acoustic effect, nor to find out which position within the viewing range allows the viewer to obtain the desired acoustic effect.

In addition, the content viewing system using an extra-large screen display such as a large wall screen television also allows plural viewers to view different content items at the same time.

In this case, when the plural viewers are adjacent to each other, the acoustic effect enjoyed by each viewer is noise for another viewer, thus making it difficult for each viewer to obtain the desired acoustic effect.

That is, a range adjacent to one viewer is a viewing range that does not allow the content reproduction apparatus to reproduce a desired acoustic effect for another viewer.

Even in this case, the conventional techniques described above have not considered the presence of the viewing range that does not allow the content reproduction apparatus to reproduce the desired acoustic effect.

This gives rise to another problem that, when plural viewers are simultaneously viewing different content items displayed on the extra-large screen display, each viewer is unable to tell which position within the viewing range will allow the viewer to obtain the desired acoustic effect.

The present invention is to solve the conventional problems described above, and it is an object of the present invention to provide a content reproduction apparatus and a content reproduction method that allow the viewer to readily find a viewing range that allows the viewer to obtain the desired acoustic effect.

[Solution to Problem]

To solve the conventional problems described above, the content reproduction apparatus according to an aspect of the present invention is a content reproduction apparatus connected to a display and speakers, and the content reproduction apparatus includes: a content display control unit which causes the display to display a first window for displaying video of first content to a first viewer and a second window for displaying video of second content to a second viewer; a sound output control unit which causes, among the speakers, at least one speaker assigned to the first content to output sound of the first content, and causes, among the speakers, at least one speaker assigned to the second content to output sound of the second content; a viewable range calculation unit which calculates a viewable range, using (i) information indicating a size of a predetermined range, (ii) the number and a position of the at least one speaker assigned to the first content, and (iii) the number of channels required for a predetermined acoustic effect, the viewable range being included in the predetermined range and being a range in which the first viewer can hear the sound of the first content with the predetermined acoustic effect included in at least one acoustic effect that is obtained from the first content and is available for reproducing the first content; and a presentation control unit which outputs information that is based on the viewable range calculated by the viewable range calculation unit, so as to present the information to the first viewer.

With this configuration, it is possible to realize a content reproduction apparatus which allows, using an extra-large screen display and speakers, each of the viewers to view different content items, and which can present, to each of the viewers, information that is based on the viewable range corresponding to each viewer. That is, each of the viewers is able to readily find the viewing range that allows obtaining the desired acoustic effect.

In addition, the viewable range calculation unit may calculate a plurality of viewable ranges each of which is calculated for a corresponding one of a plurality of acoustic effects that are available for reproducing the first content and include the predetermined acoustic effect, the content reproduction apparatus may further include a reference viewing range determination unit which determines at least one viewable range as a reference viewing range from among the plurality of viewable ranges calculated by the viewable range calculation unit, and the presentation control unit may output information that is based on the at least one viewable range determined as the reference viewing range by the reference viewing range determination unit.

In addition, the reference viewing range determination unit may obtain information indicating priority for each of the plurality of acoustic effects, and may determine, as the reference viewing range, the viewable range corresponding to the one of the plurality of acoustic effects that is either of highest priority or of lowest priority.

By thus including the reference viewable range determination unit, it is possible to meet a request from the viewer when the viewer only requests presentation of the information that is based on the viewable range corresponding to the acoustic effect of highest priority. Alternatively, it is possible to meet the request of the viewer when the viewer requests information regarding the maximum viewable range that allows the viewer to hear the sound of the content reproduced in the window under some acoustic effect.

In addition, the content reproduction apparatus according to the aspect of the present invention may further include an acceptance unit which accepts information indicating a type of an acoustic effect selected by the first viewer, and the presentation control unit may output the information that is based on the viewable range that is calculated by the viewable range calculation unit and corresponds to an acoustic effect indicated by the information accepted by the acceptance unit.

With this, for example, even in the case where the viewer has changed the desired effect, it is possible to present, to the viewer, information that is based on the viewable range corresponding to the acoustic effect after the change.

In addition, the viewable range calculation unit may calculate the viewable range of the first viewer after excluding a predetermined peripheral range of the second viewer from the predetermined range.

In addition, the viewable range calculation unit may calculate the viewable range of the first viewer by calculating only a predetermined peripheral range of the first viewer, which is included in the predetermined range.

By thus limiting the range to be calculated by the viewable range calculation unit, calculation efficiency is improved.

In addition, the content display control unit may further change a position or size of the first window and the second window, the sound output control unit may further change at least part of a combination of the at least one speaker assigned for outputting the sound of the first content, when the position or size of the second window is changed, the viewable range calculation unit may further newly calculate, when the position or size of the second window is changed, the viewable range of the first viewer, using the number and position of the speakers indicated by the combination changed by the sound output control unit, and the presentation control unit may further present, to the first user, information that is based on the viewable range newly calculated by the viewable range calculation unit.

With this, for example, in the case where one window can be enlarged or moved by closing or moving another window, it is possible to present, to the viewer, information that is based on the viewable range corresponding to the enlarged or moved window.

In addition, the presentation control unit may present the information that is based on the viewable range to the first viewer, by outputting, to the display, text or an image indicating the viewable range, and may cause the display to display the text or image, the text or image being the information based on the viewable range.

In addition, the presentation control unit may present the information that is based on the viewable range to the first viewer by outputting an instruction to illuminate the viewable range to an illumination apparatus connected to the content reproduction apparatus, and may cause the illumination apparatus to illuminate the viewable range, the instruction being the information based on the viewable range.

With this, the viewer is able to readily find the viewable range by text, an image, or the light from the illuminating apparatus.

In addition, the presentation control unit may output information indicating that the viewable range does not exist, when a result of the calculation performed by the viewable range calculation unit indicates that the predetermined range does not include the viewable range, the information indicating that the viewable range does not exist being the information based on the viewable range.

With this, the viewer is able to readily find that there is no viewable range that allows the viewer to obtain the acoustic effect as desired.

In addition, the content reproduction apparatus according to the aspect of the present invention may further include a window displayable range determination unit which (a) determines, when assuming that the first viewer is located at a position within the viewable range, a range which is on the display and in which the first window is to be displayed to the first viewer, for each position within the viewable range, and (b) determines, as a window displayable range corresponding to the viewable range, a sum of ranges on the display that are determined, and the presentation control unit may output information indicating the window displayable range determined by the window displayable range determination unit, the information indicating the window displayable range being the information based on the viewable range.

With this, the viewer is able to readily find at which position the window should be displayed to allow the viewer to obtain the desired acoustic effect. Thus, for example, the configuration described above is useful in the case of moving the window by, for example, the viewer moving or giving an instruction to the content reproduction apparatus.

In addition, the content reproduction apparatus according to the aspect of the present invention may further include a window displayable range determination unit which (a) determines, when assuming that the first viewer is located at a position within the viewable range, a range which is on the display and in which the first window is to be displayed to the first viewer, for each position within the viewable range, and (b) determines, as a window displayable range corresponding to the viewable range, a sum of ranges on the display that are determined, and the presentation control unit may present the information that is based on the viewable range to the first viewer by causing the display to display at least part of the first window within the window displayable range determined by the window displayable range determination unit.

With this, for example, the viewer is able to readily find that moving to a position in front of the window allows the viewer to obtain the desired acoustic effect. That is, the configuration described above can guide the viewer into the viewable range.

In addition, the content reproduction apparatus may further include a current viewing position determination unit which determines, using information for identifying the position of the first viewer, a viewing position that is a position at which the first viewer is located, the information being obtained from an external apparatus connected to the content reproduction apparatus, and the presentation control unit may output the information that is based on both the viewable range and the viewing position that is determined by the current viewing position determination unit.

In addition, the current viewing position determination unit may regularly determine the viewing position, using information regularly obtained from the external apparatus, and the presentation control unit may output the information that is based on the viewable range, when a difference between a latest viewing position and a previous viewing position determined before the latest viewing position is equal to or above a predetermined threshold.

In addition, the presentation control unit may determine whether or not the viewing position determined by the current viewing position determination unit falls within the viewable range, and may output the information that is based on the viewable range when the viewing position does not fall within the viewable range.

In addition, the presentation control unit may output, when the viewing position does not fall within the viewable range, information regarding a direction in which the first viewer is to move so that the viewing position falls within the viewable range, the information regarding the direction in which the first viewer is to move being the information based on the viewable range.

By thus using the viewing position determined by the current viewing position determination unit, it is possible to correctly inform the viewer whether or not to move, or to which position to move in order to obtain the desired acoustic effect.

In addition, even in the case where the viewer moves in the middle of viewing the content, it is possible to correctly provide the viewer with information that is based on the viewable range according to the position after the move.

In addition, the present invention can also be realized as a content reproduction method including, as steps, characteristic constituent elements of the content reproduction apparatus according to an implementation of the present invention, or as a program causing a computer to execute these steps, or as a recording medium on which such a program is recorded. Furthermore, the program can be distributed via a transmission medium such as the Internet or a recording medium such as a digital versatile disc (DVD).

[Advantageous Effects of Invention]

According to an implementation of the present invention, it is possible to present to a viewer, information that is based on a viewable range that allows obtaining an acoustic effect desired by the viewer. With this, the viewer is able to readily find the viewing range that allows the viewer to obtain the desired acoustic effect.

(Further information about technical background to this application)

The disclosure of Japanese Patent Application No. 2008-154473 filed on Jun. 12, 2008 including specification, drawings and claims is incorporated herein by reference in its entirety.

DESCRIPTION OF EMBODIMENTS

Hereinafter, an embodiment of the present invention will be described with reference to the drawings. Note that the same reference sign in each figure is used for the same constituent element.

The present embodiment is to describe a content viewing system which allows at least one viewer to view different content items in different windows, using an extra-large screen display which covers a major part of a wall.

The content viewing system according to the present embodiment includes a content reproduction apparatus which can present, to each viewer, information that is based on a viewable range which allows each viewer to obtain a desired acoustic effect.

Figure 1:
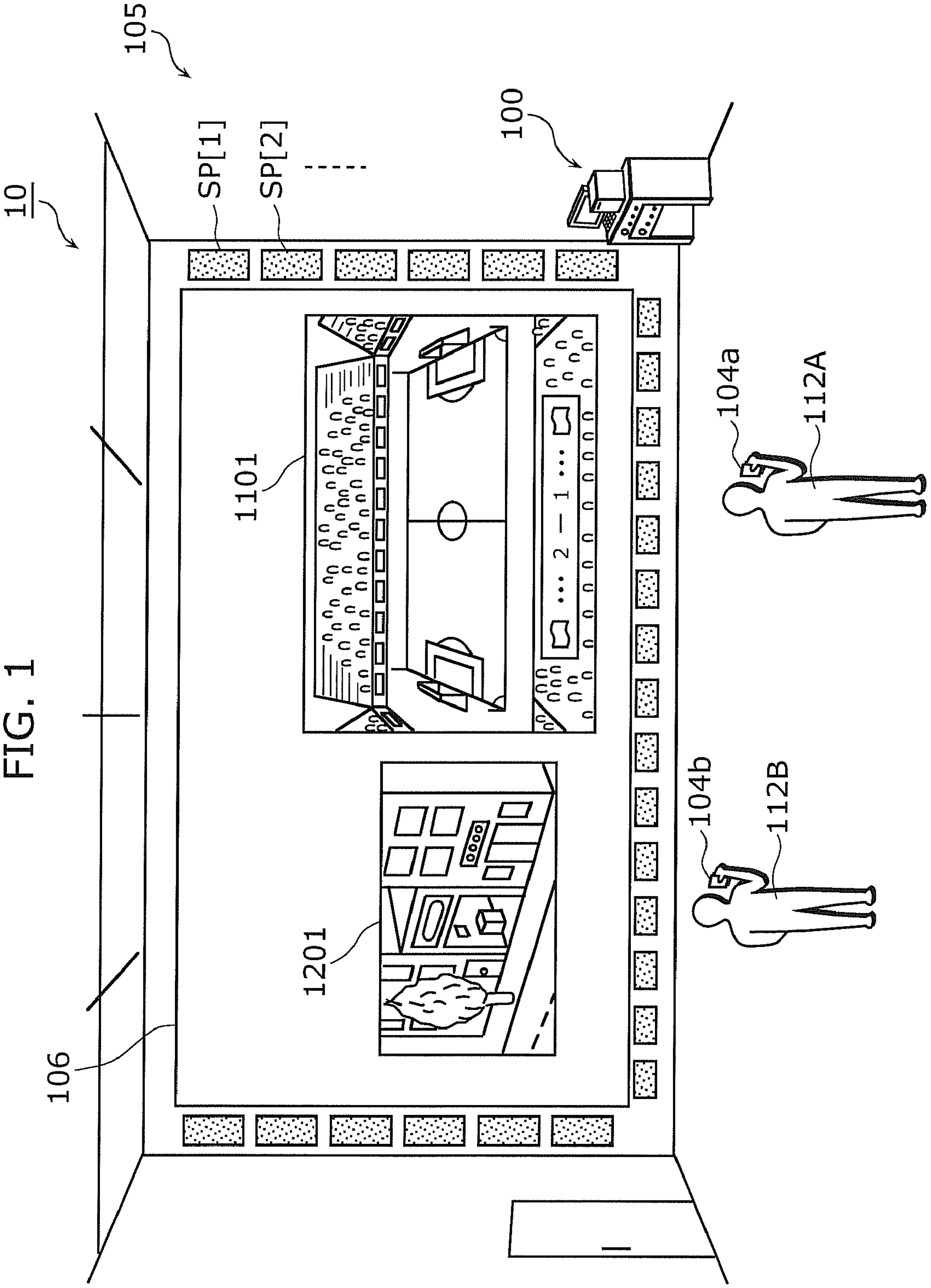
FIG. 1 is a diagram showing an external view of a content viewing system according to an embodiment of the present invention.

FIG. 1 is a diagram showing an external view of the content viewing system according to the present embodiment.

As shown in FIG. 1, a content viewing system 10 includes: a display 106, a speaker apparatus 105, and a content reproduction apparatus 100.

The display 106 is a display apparatus having a size covering a major part of one wall of a room in which the content viewing system 10 is provided. The display area of the display 106 includes one or more display panels and is approximately 5 meters long and 10 meters wide, for example.

The speaker apparatus 105 has plural speakers. In the present embodiment, the speaker apparatus 105 has n speakers from a first speaker (SP[1]) to an n-th speaker (SP[n]).

The content reproduction apparatus 100 can cause the display 106 to display at least one content item and can also cause the speaker apparatus 105 to output sound of the at least one content item.

FIG. 1 shows two viewers (a first viewer 112A and a second viewer 112B) viewing different content items.

Specifically, the first viewer 112A is viewing a soccer relay broadcast displayed in a first viewing window 1101. At the same time, the second viewer 112B is viewing a news video displayed in a second viewing window 1201.

In addition, each window is assigned with at least one of the speakers. That is, each content item and each viewer is assigned with at least one speaker. Each viewer is listening to the sound reproduced with an acoustic effect desired by the viewer.

For example, the first viewer 112A is listening to the sound of the soccer relay broadcast in surround sound via two or more speakers assigned to the first viewing window 1101 (for example, in virtual surround sound via three speakers in front of the first viewer 112A).

In addition, for example, the second viewer 112B is listening to the commentary sound of the news video in stereo sound via two or more speakers assigned to the second viewing window 1201.

Note that the first viewer 112A can switch the acoustic effect and so on by handling a first controller 104*a*. At the same time, the second viewer 112B can switch the acoustic effect and so on by handling a second controller 104*b*.

In addition, FIG. 1 shows plural speakers arranged along right, left, and bottom sides, but the layout of the plural speakers is not limited to the one shown in FIG. 1.

For example, in addition to the respective positions shown in FIG. 1, such plural speakers may also be provided beside and behind the viewer.

In addition, the viewers using the content viewing system 10 may not necessarily be two people, that is, the first viewer 112A and the second viewer 112B, but may be three or more, or may be one.

Figure 2:
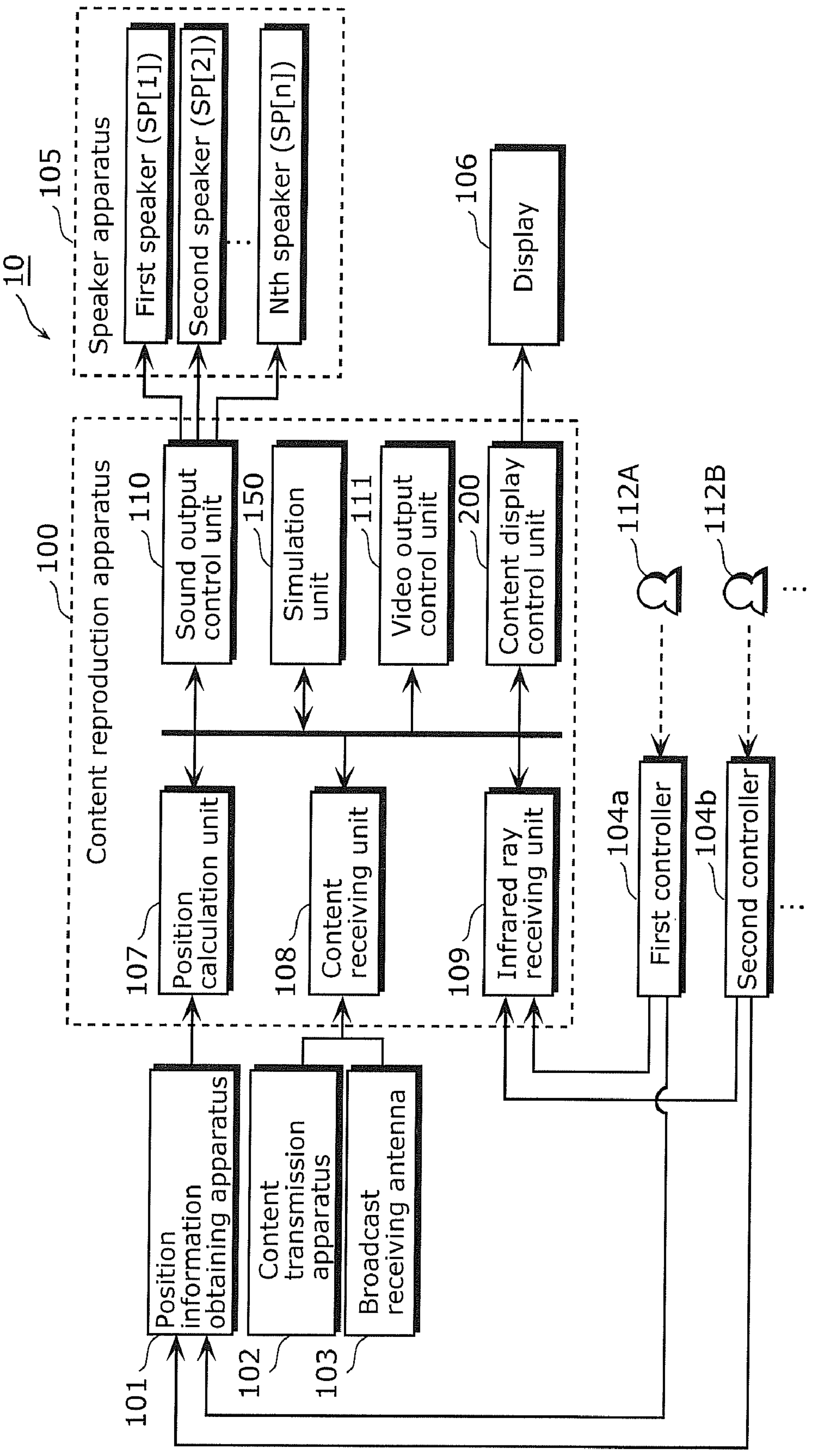
FIG. 2 is a diagram showing a main configuration of the content viewing system according to the embodiment of the present invention.

FIG. 2 is a block diagram showing a main configuration of the content viewing system 10 according to the present embodiment.

As shown in FIG. 2, the content viewing system 10 includes, in addition to each constituent element described above, a position information obtaining apparatus 101, a content transmission apparatus 102, and a broadcast receiving antenna 103.

In addition, as shown in FIG. 2, the content reproduction apparatus 100 includes: a position calculation unit 107, a content receiving unit 108, an infrared ray receiving unit 109, a sound output control unit 110, a video output control unit 111, a simulation unit 150, and a content display control unit 200.

Note that, of the constituent elements of the content reproduction apparatus 100, for example, the position calculation unit 107 and the sound output control unit 110 need not be included in the content reproduction apparatus 100. These constituent elements, for example, may be connected to the content reproduction apparatus 100 as external apparatuses.

Each of the first controller 104*a* and the second controller 104*b*, as described earlier, is an apparatus with which each viewer controls the content reproduction apparatus 100 or inputs various setting values into the content reproduction apparatus 100.

Each of the controllers in the present embodiment is a remote controller which transmits a control signal to the content reproduction apparatus 100 by infrared ray.

Note that each viewer is provided with one controller. That is, when N viewers use the content viewing system 10 at the same time, N controllers are provided.

In addition, one of the plural viewers including the first viewer 112A and the second viewer 112B is hereinafter referred to as the "viewer", and one of the plural controllers including the first controller 104*a* and the second controller 104*b* is hereinafter referred to as the "controller".

Each controller is assigned with a unique controller ID at the time of manufacturing. Furthermore, each viewer is assumed to constantly carry the controller while using the content viewing system 10. Thus, in the present embodiment, the controller ID is also used as a viewer ID indicating each viewer.

More specifically, in the present embodiment, the controller ID of the first controller 104*a* is used as the viewer ID of the first viewer 112A, and the controller ID of the second controller 104*b* is used as the viewer ID of the second viewer 112B.

Each controller, when transmitting the control signal to the content reproduction apparatus 100, transmits the controller ID along with the control signal. By identifying the controller ID, the content reproduction apparatus 100 can identify which one of the plural controllers has transmitted the control signal.

As a result, the content reproduction apparatus 100 can identify which one of the viewers has transmitted the control signal that is received.

Note that in the present embodiment, as an apparatus with which the viewer performs control or the like on the content reproduction apparatus 100, a controller which performs infrared communications as described above is used. However, another type of input apparatus such as a keyboard or a pointing device may also be used.

In addition, the controller ID may not necessarily be factory-assigned to each controller. The controller ID may be assigned at the time of default setting of the content viewing system 10, or may be assigned each time the controller is turned on.

The infrared ray receiving unit 109 is an example of an acceptance unit in the content reproduction apparatus according to the present invention, and is a device which receives control signals transmitted from the first controller 104*a* and the second controller 104*b*.

The position information obtaining apparatus 101 is an apparatus which obtains information for identifying the position of the viewer, and includes a wireless antenna, the first controller 104*a*, and the second controller 104*b*.

That is, in the present embodiment, the first controller 104*a* and the second controller 104*b* also function as constituent elements of the position information obtaining apparatus 101. Specifically, these controllers include a camera for obtaining position information of the viewer carrying the camera.

The viewer, as described earlier, constantly carries the controller while using the content viewing system 10. Thus, by obtaining the controller ID and the image captured by a camera device included in each controller, the position information obtaining apparatus 101 can determine the position of each of the plural viewers. That is, the position information obtaining apparatus 101 can obtain information for identifying the position of each of the plural viewers.

The position calculation unit 107 is a device which calculates a relative position of the viewer with respect to the display 106, based on the information obtained by the position information obtaining apparatus 101.

The position calculation unit 107, upon receiving viewing position measurement request information 900 from a current viewing position determination unit 204 or the like, calculates the relative position, with respect to the display 106, of the viewer indicated by viewer ID 901, and returns a result of the calculation as viewing position information 1000.

Note that the viewing position measurement request information 900 and the viewing position information 1000 are described below with reference to FIGS. 8 and 9.

In the present embodiment, the position calculation unit 107 calculates the relative position of the viewer with respect to the display 106 as below. Note that an outline of processing performed by the position calculation unit 107 when calculating the position of the first viewer 112A will be described as a specific example.

When the first viewer 112A is located at a certain position, the camera in the first controller 104*a* obtains an image of the display 106, which is captured from the position of the viewer.

The first controller 104*a* transmits the captured image to the position information obtaining apparatus 101. The position information obtaining apparatus 101 obtains the image via the wireless antenna, and outputs the image to the position calculation unit 107.

The position calculation unit 107 calculates a relative position of the first controller 104*a* with respect to the display 106, based on a position, size, and so on of a whole or part of the display 106 included in the image received via the position information obtaining apparatus 101.

The position calculation unit 107 determines the relative position, thus obtained, of the first controller 104*a* with respect to the display 106 as the relative position of the first viewer 112A with respect to the display 106.

Note that a technique for calculating, based on a television image captured by a remote controller, the relative position of the remote controller with respect to the television is disclosed in, for example, Japanese Unexamined Patent Application Publication No. 2006-166295 (Patent Literature 1) "Control system, controlled device suited to the system and remote control device".

The following is another technique for the position calculation unit 107 to calculate the relative position of the viewer with respect to the display 106.

For example, a global positioning system (GPS) device is attached to each controller and the display 106. Each controller transmits, to the position information obtaining apparatus 101, position information measured by the GPS device included in the controller itself, along with the controller ID.

The position calculation unit 107 calculates the relative position, with respect to the display 106, of the controller indicated by each controller ID, based on each controller ID and position information that have been received via the position information obtaining apparatus 101 and the position information measured by the GPS device included in the display 106. Furthermore, the position calculation unit 107 determines each of such relative positions thus calculated to be the relative position of each viewer with respect to the display 106.

Naturally, the position information obtaining apparatus 101 and the position calculation unit 107 may use a combination of the above two techniques or may use another technique for measuring and calculating the relative position of each viewer with respect to the display 106.

In addition, the position information obtaining apparatus 101 only needs to obtain the information for identifying the position of the viewer, and the functional configuration for satisfying this purpose is not limited to the example given above.

The content transmission apparatus 102 is a device which transmits the content data to the content reproduction apparatus 100. The content receiving unit 108 receives the content data transmitted by the content transmission apparatus 102. The content transmission apparatus 102, for example, may be a content distribution server connected to the content reproduction apparatus 100 via a network, or may be a media reproduction apparatus such as a DVD drive. Naturally, the application is not limited to these.

In addition, when the content transmission apparatus 102 is a media reproduction apparatus such as a DVD drive, the content transmission apparatus 102 may be included in the content reproduction apparatus 100.

The broadcast receiving antenna 103 is an antenna which receives an airwave including content data. The received airwave is transmitted to the content receiving unit 108.

Note that the content viewing system 10 only needs to include at least one of the content transmission apparatus 102 and the broadcast receiving antenna 103, and may not necessarily include both.

The content receiving unit 108 receives the content data from the content transmission apparatus 102. Alternatively, the content receiving unit 108 demodulates the airwave received from the broadcast receiving antenna 103, so as to receive the content data.

The content receiving unit 108 transmits a video part of the received content data to the video output control unit 111, and transmits a sound part of the content data to the sound output control unit 110. Note that the content receiving unit 108 converts the video part and sound part of the content data into an input format required respectively by the video output control unit 111 and the sound output control unit 110, and transmits the converted data respectively to the video output control unit 111 and the sound output control unit 110.

For example, the content receiving unit 108 decodes the received content data when the data is coded, and decompresses the received content data when the data is compressed. Note that the content receiving unit 108 may receive plural content data at the same time, and in this case, performs the conversion processing on each content datum.

The speaker apparatus 105 is an apparatus which reproduces sound, and has plural speakers from SP[1] to SP[n] as described above.

The sound output control unit 110 is a device which outputs, to the speaker apparatus 105, the sound of the content received by the content receiving unit 108. Furthermore, the sound output control unit 110 controls an assignment and output characteristics of the sound that is output to each speaker included in the speaker apparatus 105 so that the viewer can hear the sound with a desired acoustic effect.

In the case where the content receiving unit 108 receives plural content data, the sound output control unit 110 determines the speaker to be assigned to each content with reference to an assignment table 121 described below, or changes the acoustic effect according to each content.

The simulation unit 150 is a processing unit which receives, from the content display control unit 200, acoustic effect simulation request information 700 shown in FIG. 6 and described below, and calculates, by simulation, whether a predetermined simulation range includes a range which allows reproducing the designated acoustic effect for the viewer, for each acoustic effect set in a desired acoustic effect list 702.

In other words, the simulation unit 150 is a processing unit that calculates a viewable range which is a range included in a predetermined range and in which the viewer is located and is able to hear the sound of the content with a predetermined acoustic effect.

Note that the simulation unit 150 is an example of a viewable range calculation unit in the content reproduction apparatus according to an implementation of the present invention.

The following will describe an outline of the processing performed by the simulation unit 150.

The simulation unit 150 obtains static information necessary for the simulation. The static information is information such as: the number, positions, and characteristics of plural speakers included in the speaker apparatus 105; and a shape, various dimensions, and a wall material of the room in which the content viewing system 10 is provided.

Note that information such as the room shape is an example of information that indicates a predetermined range and is used for calculating the viewable range by the content reproduction apparatus according to an implementation of the present invention.

The static information as above, for example, is input into the simulation unit 150 by an operator or the viewer, when the content viewing system 10 is provided or activated. Thus, static information is set for the simulation unit 150.

Note that the whole simulation range is determined by the shape and dimensions of the room and so on that are set at this time.

The simulation unit 150 further obtains dynamic information necessary for the simulation. The dynamic information is information obtained from the content reproduced by the content reproduction apparatus 100, such as: a required number of channels for each of at least one acoustic effect available for reproducing the sound of the content; and a type of acoustic effect selected by the viewer from among types of the at least one acoustic effect. In addition, in the case where plural viewers use the content viewing system 10 at the same time, the simulation unit 150 obtains, as dynamic information, the number and positions of the viewers, and the number and positions of speakers assigned to the window for each viewer.

The sound output control unit 110 holds, as the assignment table 121, information indicating an association between the number and positions of the viewers and the speakers. The configuration of the sound output control unit 110 will be described below with reference to FIG. 4.

For example, when the first viewer 112A is the only viewer using the content viewing system 10, the simulation unit 150 obtains from, for example, the position calculation unit 107, information indicating that there is one viewer. In addition, the simulation unit 150 assigns, for example, all the speakers included in the speaker apparatus 105 to the first viewer 112A as available speakers, with reference to the assignment table 121 held by the sound output control unit 110.

In addition, in the case where the content viewed by the first viewer 112A is reproducible with, for example, each of monaural, stereo, and surround sound effects, the simulation unit 150 obtains, from the content, information indicating these three types of acoustic effects and the required number of channels.

The simulation unit 150, using these different types of information, calculates a range that allows reproducing at least one type of acoustic effect from among these three types of acoustic effects. For example, the simulation unit 150 calculates a range that allows the first viewer 112A to obtain the surround sound effect, by calculating a transmission range of the sound (including sound reflected off the walls) output from each of the speakers used for surround sound reproduction, and a sound level at each position and so on within the transmission region.

The information, thus obtained and indicating the simulation result for each acoustic effect, is transmitted to the sound output control unit 110.

Note that such a technique related to the simulation in an acoustic field is disclosed in, for example: Japanese Patent No. 3482055 "High precision acoustic line tracking device and high precision acoustic line tracking method" (Patent Literature 3) and Japanese Unexamined Patent Application Publication No. 2003-122374 "Surround sound generating method, and its device and its program" (Patent Literature 4).

The sound output control unit 110 stores a value of a viewer ID 701 included in the acoustic effect simulation request information 700, for the viewer ID 701 in viewable range information 800 shown in FIG. 7 and described below.

The sound output control unit 110 further stores, in the viewable range list 802, a result of the acoustic effect simulation corresponding to the acoustic effect set in the desired acoustic effect is list 702, among the results of the acoustic effect simulation according to the respective acoustic effects obtained from the simulation unit 150.

The sound output control unit 110 transmits the viewable range information 800 thus generated to the content display control unit 200.

The video output control unit 111 is a device which processes the video part of the content data received by the content receiving unit 108. Specifically, the content receiving unit 108 changes resolution or an aspect ratio of the video part, or applies an image effect such as chroma adjustment to the video part.

The video part of the content data processed by the video output control unit 111 is transmitted to the content display control unit 200, to be displayed on the display 106. In the case where plural content data are received by the content receiving unit 108, the processing content may be changed according to each content data item.

The content display control unit 200 is a device which controls the content to be displayed on the display 106. The content display control unit 200 generates a window for displaying the content video processed by the vide output control unit 111, and displays the content video in the window. Furthermore, the content display control unit 200 displays, on the display 106, information that is based on the viewing position that allows the viewer to obtain the desired acoustic effect, based on the relative position of the viewer with respect to the display 106, and so on.

That is, the display 106 displays at least one content video item and various types of information that are output from the content display control unit 200.

Figure 3:
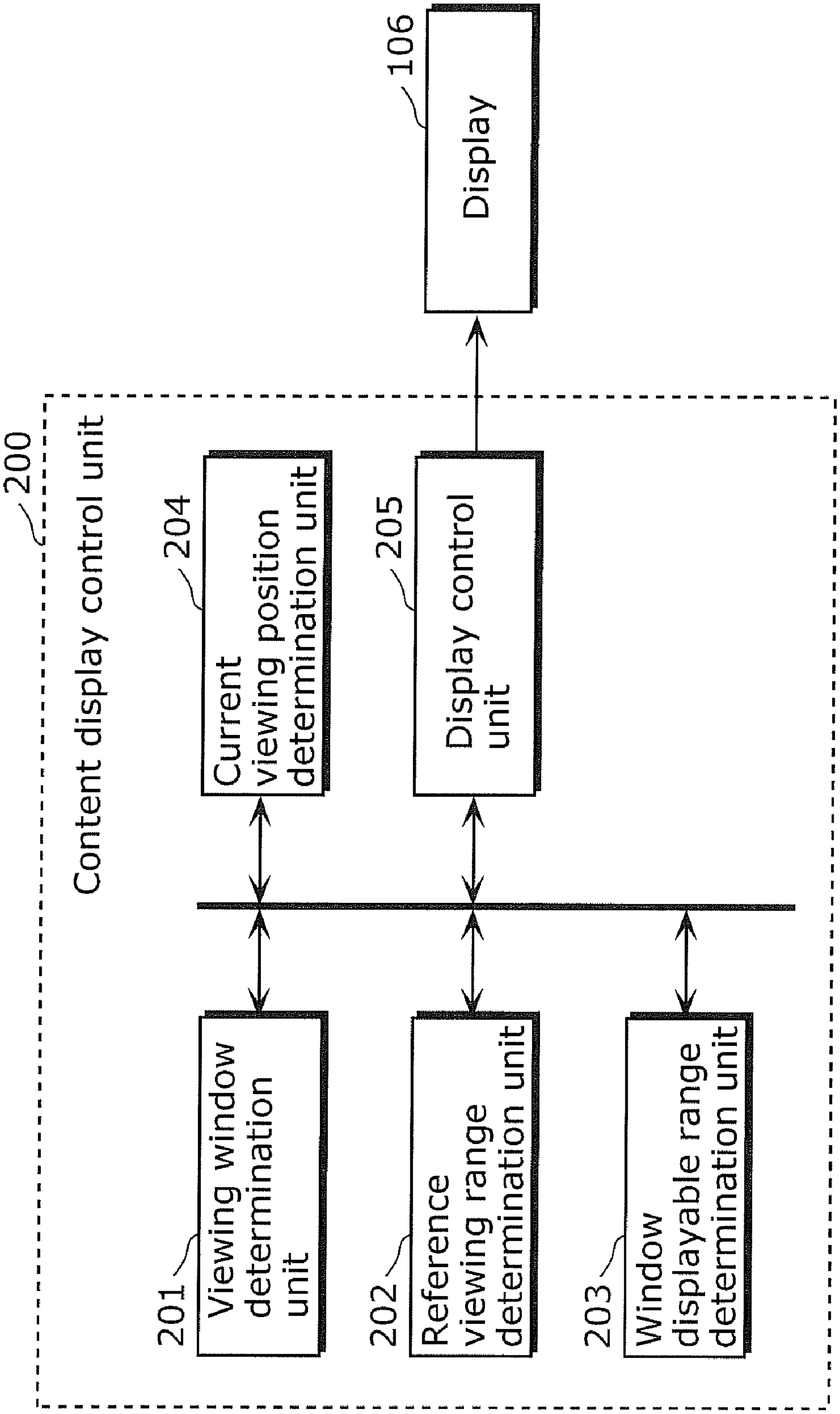
FIG. 3 is a diagram showing a main configuration of a content display control unit according to the embodiment of the present invention.

FIG. 3 is a diagram showing a main configuration of the content display control unit 200 according to the present embodiment.

As shown in FIG. 3, the content display control unit 200 includes: a viewing window determination unit 201, a reference viewing range determination unit 202, a window displayable range determination unit 203, a current viewing position determination unit 204, and a display control unit 205.

The viewing window determination unit 201 associates one viewer with one window displayed on the display 106. In addition, in the case where there are plural viewers, the viewing window determination unit 201 associates the plural viewers with plural windows on a one-to-one basis. Hereinafter, the window associated with the viewer by the viewing window determination unit 201 is described as a viewing window.

The reference viewing range determination unit 202 transmits, to the simulation unit 150, the acoustic effect simulation request information 700 shown in FIG. 6 and described below, and receives, from the sound output control unit 110, the viewable range information 800 shown in FIG. 7 and described below.

The reference viewing range determination unit 202 further determines, from the viewable range information 800 that is received, a viewable range that allows the viewer to obtain the desired acoustic effect. Hereinafter, the viewable range determined by the reference viewing range determination unit 202 is described as a reference viewing range.

That is, from among N viewing ranges corresponding to N acoustic effects, the reference viewing range determination unit 202 determines 1 to N viewing ranges to be the reference viewing range.

Assuming that the viewer is located within the reference viewing range, the window displayable range determination unit 203 determines, on the display 106, a range which allows display of the viewing window. Hereinafter, the range on the display 106 which is thus determined by the window displayable range determination unit 203 is described as a window displayable range.

The current viewing position determination unit 204 determines the current position of the viewer, based on the relative position of the viewer with respect to the display 106, which is calculated by the position calculation unit 107. Hereinafter, the position of the viewer determined by the current viewing position determination unit 204 is described as a current viewing position.

The display control unit 205 is an example of a presentation control unit in the content reproduction apparatus in the present invention. Based on the current viewing position, the reference viewing range and so on, the display control unit 205 displays, on the display 106, information that is based on the viewable range that allows the viewer to obtain the desired acoustic effect. In addition, the display control unit 205 performs an overall display control on the window displayed on the display 106, such as displaying, in the window, the video processed by the vide output control unit 111.

Figures 4, 5:
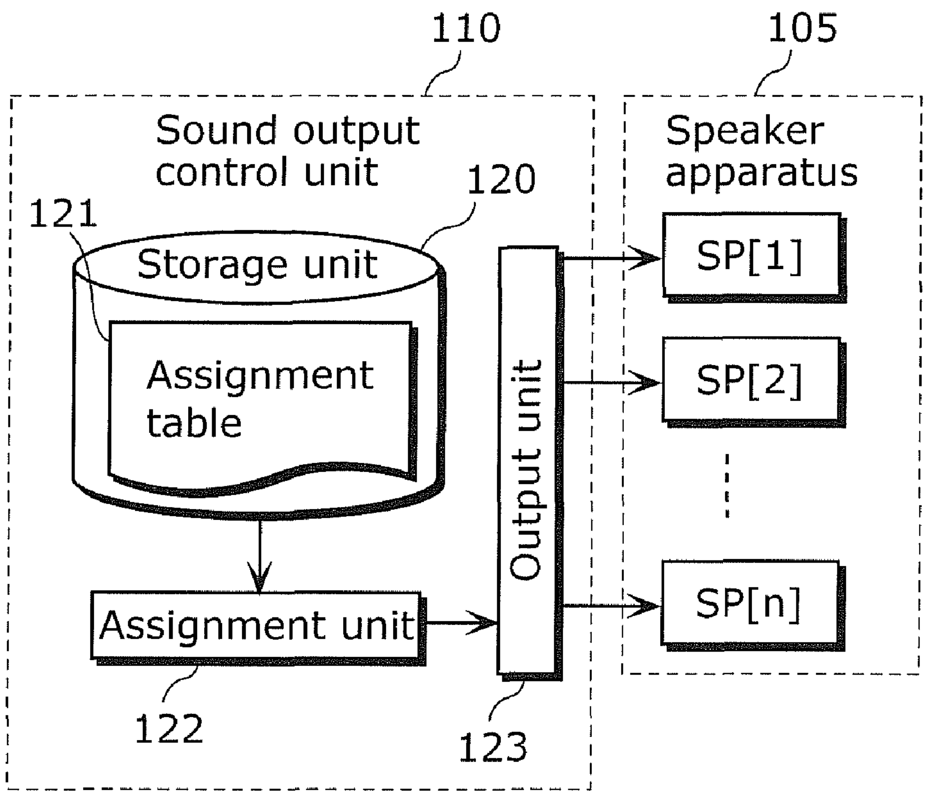
FIG. 4 is a diagram showing a main configuration of a sound output control unit according to the embodiment of the present invention.
FIG. 5 is a diagram showing an example data configuration of an assignment table according to the embodiment of the present invention.

FIG. 4 is a diagram showing a main configuration of the sound output control unit 110 according to the present embodiment.

As shown in FIG. 4, the sound output control unit 110 includes a storage unit 120, an assignment unit 122, and an output unit 123.

The storage unit 120 is a storage device in which the assignment table 121 is stored.

The assignment unit 122 is a processing unit which selects, with reference to the assignment table 121, a speaker to be assigned to the viewer from among the plural speakers included in the speaker apparatus 105, according to, for example, the acoustic effect selected by the viewer. Note that the assignment unit 122 also generates the viewable range information 800 shown in FIG. 7 and described below.

The output unit 123 is a processing unit which selectively outputs, to each speaker, sound according to the acoustic effect designated by the viewer, based on an assignment result received from the assignment unit 122.

FIG. 5 is a diagram showing an example data configuration of the assignment table 121.

As shown in FIG. 5, an identifier of each speaker assigned to each viewer is registered with the assignment table 121 according to the number of viewers.

Note that each of "a" and "b" in the "viewer" column in the assignment table 121 is an identifier assigned to each viewer. In addition, in the case where there are plural viewers, such identifiers are assigned in order of "a", "b", . . . , starting from the viewer located rightmost as one faces the display 106.

For example, when the first viewer 112A is the only viewer using the content viewing system 10, the first viewer 112A is "a" in the assignment table 121 and is assigned with all the speakers from SP[1] to SP[n].

In addition, for example, another case is assumed where two viewers are using the content viewing system 10, and as shown in FIG. 1, the viewers are located in order of the first viewer 112A and the second viewer 112B, starting from the right as one faces the display 106. In this case, the first viewer 112A is "a" in the assignment table 121, and the second viewer 112B is "b" in the assignment table 121.

In addition, in this case, the first viewer 112A is assigned with speakers SP[1] to SP[m], and the second viewer 112B is assigned with speakers SP[m+1] to SP[n]. Note that n and m are integers and n>m, but each of them is not limited to a specific numerical value. For example, where n=20, m may be 10 (m=10), or may be 12 (m=12).

The simulation unit 150 determines a combination of speakers assigned to each viewer, with reference to this assignment table 121. Furthermore, the simulation unit 150 uses, for acoustic effect simulation, the position or the like of each speaker in the determined combination. Note that in some cases the simulation unit 150 outputs a result indicating that there is no viewable range corresponding to the predetermined acoustic effect, depending on the combination of the speakers indicated by the assignment table 121.

Note that the assignment unit 122 and the simulation unit 150 may increase or decrease, for example, the number of speakers assigned to the viewer according to the viewing position of the viewer, based on the information indicated by the assignment table 121, instead of using the information indicated by the assignment table 121 without modification.

In addition, the data configuration of the assignment table 121 shown in FIG. 5 is a mere example, and another combination of viewers and a group of speakers may be adopted.

For example, the group of speakers assigned to each viewer may include at least one speaker that is not assigned to anyone, so as to reduce, as much as possible, interference of different sounds intended for the respective viewers. For example, when speakers SP[1] to SP[m] are assigned to "a", speakers SP[m+2] to SP[n] may be assigned to "b".

In addition, in the present embodiment, when a speaker is assigned to one of the viewers, the speaker is used as a dedicated speaker for the viewer (that is, the content) until the viewer finishes viewing the content. However, for example, as long as the speaker can output sounds of different content items by time division, the speaker may be used as a speaker to be shared by the plural viewers (that is, plural content items).

Figure 6:
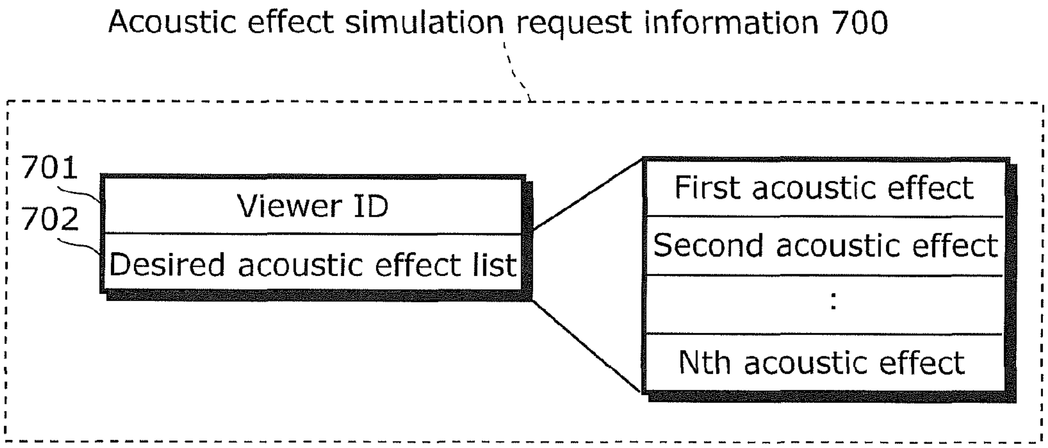
FIG. 6 is a diagram showing an example data configuration of acoustic effect simulation request information according to the embodiment of the present invention.

FIG. 6 is a diagram showing an example data configuration of the acoustic effect simulation request information 700.

As shown in FIG. 6, the acoustic effect simulation request information 700 includes a viewer ID 701 and the desired acoustic effect list 702.

The acoustic effect simulation request information 700 is information generated by the reference viewing range determination unit 202, based on the desired acoustic effect selected, in step S304 shown in FIG. 12 and described below, by the viewer using the controller carried by the viewer.

The reference viewing range determination unit 202 transmits the acoustic effect simulation request information 700 to the simulation unit 150. With this, the reference viewing range determination unit 202 requests the simulation unit 150 to simulate the viewable range that allows the viewer indicated by the viewer ID 701 to obtain the desired acoustic effect (the acoustic effect listed in the desired acoustic effect list 702).

The viewer ID 701 is an ID for identifying each viewer. In the present embodiment, the controller ID assigned to the controller carried by the viewer is set for the viewer ID 701.

The desired acoustic effect list 702 is a list of desired acoustic effects selected by the viewer using the controller in step S304 shown in FIG. 12 and described below.

Note that the viewer, in the case of giving priority to the desired acoustic effect, sets an acoustic effect of highest priority as a first acoustic effect in the desired acoustic effect list 702, and sets an acoustic effect of the lowest priority as an Nth acoustic effect. By thus storing the acoustic effects in the desired acoustic effect list 702 in order of priority, it is not necessary to separately store priority information.

Figure 7:
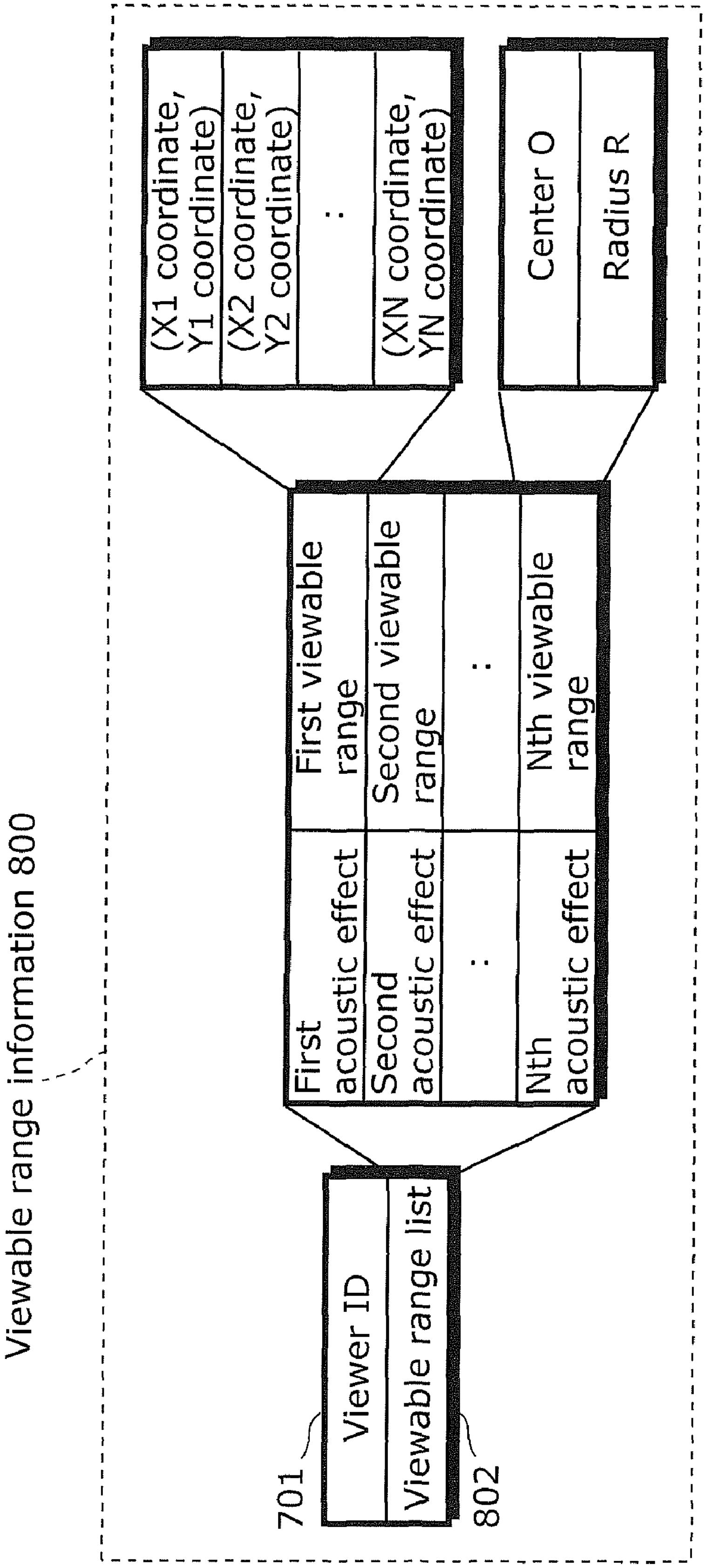
FIG. 7 is a diagram showing an example data configuration of viewable range information according to the embodiment of the present invention.

FIG. 7 is a diagram showing an example data configuration of the viewable range information 800. In FIG. 7, the viewable range information 800 includes the viewer ID 701 and the viewable range list 802.

The viewable range information 800 is information generated by the sound output control unit 110, based on the result of the acoustic effect simulation performed by the simulation unit 150.

Upon receiving the acoustic effect simulation request information 700 from the reference viewing range determination unit 202 or the like, the simulation unit 150 simulates a range (viewable range) that allows reproducing, for the viewer indicated by the viewer ID 701, the acoustic effect included in the desired acoustic effect list 702, within the simulation range that is previously determined. The simulation unit 150 further transmits the result to the sound output control unit 110, along with the acoustic effect simulation request information 700. Based on the result, the sound output control unit 110 stores, in the viewable range list 802, a set of coordinates indicating the acoustic effect and a range that allows obtaining the acoustic effect.

Note that the order of storing such sets of coordinates in the viewable range list 802 is matched to the order of the acoustic effects stored in the desired acoustic effect list 702. Through this matching of the storage orders, the acoustic effect of highest priority is set as the first acoustic effect in the viewable range list 802, and the acoustic effect of lowest priority is set as the Nth acoustic effect. That is, information indicating priority set in the desired acoustic effect list 702 is not lost.

For the viewer ID 701 in the viewable range information 800, the sound output control unit 110 stores the same value as the viewer ID 701 included in the acoustic effect simulation request information 700.

In the present embodiment, the simulation range is a three-dimensional space which is determined, as described above, by values input into the simulation unit 150 by the operator or the viewer, such as various dimensions making up the entire room space in which the content is viewed.

However, the simulation range may be previously set at the time of manufacturing the content reproduction apparatus 100, and the simulation range is not limited to the entire room space in which the content is viewed but may also be part of the room.

The viewable range in the viewable range list 802 is defined by a set of coordinate points or a set of center and radius of a circle on a bottom surface of the three-dimensional space of the simulation range, that is, a two-dimensional plane where the three-dimensional space of the simulation range intersects with a zero-height plane.

The range in which the acoustic effect can be obtained is a range that is represented by connecting the coordinate points of the viewable range or a range of a circle represented by a set of center and radius of the circle indicates in the viewable range list 802.

For example, in FIG. 7, the range in which the viewer indicated by the viewer ID 701 is able to obtain the first acoustic effect included in the desired acoustic effect list 702 is a range represented by connecting respective coordinates from (X1 coordinate, Y1 coordinate) to (XN coordinate, YN coordinate).

In addition, the viewer is able to obtain the Nth acoustic effect included in the desired acoustic effect list 702, within a range indicated by a circle with radius R and center O.

In some cases, the result of the acoustic effect simulation is not accurately reflected when the viewable range in the viewable range list 802 is expressed using two-dimensional plane coordinate points instead of three-dimensional coordinate points.

However, it is possible to simplify calculation processing in comparing the viewable range in viewing position coordinates 1002 shown in FIG. 9 and described below, with the viewable range in the viewable range list 802. Furthermore, when presenting to the viewer the viewable range that allows obtaining the desired acoustic effect, it is also possible to perform presentation in a form more understandable to the viewer.

However, in order to reflect the result of the acoustic result simulation more accurately in the content viewing system 10, all the processing including the notation format of the coordinate points and the technique of presentation to the viewer may be performed in the three-dimensional space. In this case, the viewable range in the viewable range list 802 includes a set of coordinate points in the three-dimensional space or a set of center and radius of a circle.

In this case, the viewing position coordinates 1002 in the viewing position information 1000 shown in FIG. 9 and described below are made up of a set of coordinate points or a set of center and radius of the circle in the three-dimensional space. It goes without saying that the technique for representing the viewing position coordinates 1002 and the viewable ranges in the viewable range list 802 is not limited to the example given in the present embodiment, and an optimum technique may be adopted according to each content reproduction apparatus 100.

Note that an origin of the two-dimensional plane for representing the viewable range in the viewable range list 802 is automatically determined from the simulation range by the simulation unit 150.

Note that when, as a result of the acoustic effect simulation, there is no viewable range that allows obtaining a certain acoustic effect, the viewable range list 802 need not include the result, and may include only the origin (0, 0) for the viewable range. Alternatively, the viewable range list 802 may include other predetermined information indicating that there is no viewable range. That is, any technique is available as long as it allows informing the reference viewing range determination unit 202 that there is no viewable range that allows obtaining the acoustic effect.

Figure 8:
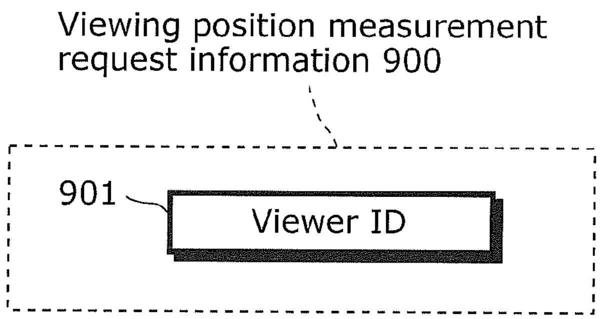
FIG. 8 is a diagram showing an example data configuration of viewing position measurement request information according to the embodiment of the present invention.

FIG. 8 is a diagram showing an example data configuration of the viewing position measurement request information 900. In FIG. 8, the viewing position measurement request information 900 includes a viewer ID 901.

The viewing position measurement request information 900 is information which is generated and transmitted by the current viewing position determination unit 204 so as to request the position calculation unit 107 to calculate the relative position of the viewer indicated by the viewer ID 901 with respect to the display 106.

The viewer ID 901 is an identifier for the viewer whose relative position with respect to the display 106 is to be calculated. In the present embodiment, the controller ID assigned to the controller carried by the viewer is set for the viewer ID 901.

Figure 9:
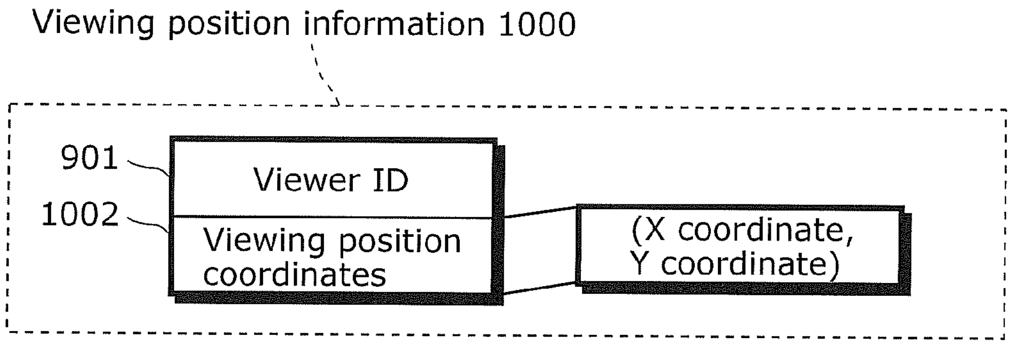
FIG. 9 is a diagram showing an example data configuration of viewing position information according to the embodiment of the present invention.

FIG. 9 is a diagram showing an example data configuration of the viewing position information 1000. In FIG. 9, the viewing position information 1000 includes the viewer ID 901 and the viewing position coordinates 1002.

The viewing position information 1000 is information generated by the position calculation unit 107, based on the result of calculating the relative position of the viewer with respect to the display 106.

The position calculation unit 107, upon receiving the viewing position measurement request information 900 from the current viewing position determination unit 204 and so on, calculates the relative position of the viewer indicated by the viewer ID 901 with respect to the display 106, using a value available from the position information obtaining apparatus 101, and stores the result for the viewing position coordinates 1002.

For the viewer ID 901, the position information obtaining apparatus 101 stores the same value as the viewer ID 901 included in the viewing position measurement request information 900.

For the viewing position coordinates 1002, a value representing the viewer's position as a coordinate point on the two-dimensional plane is stored. Used for the two-dimensional plane including the coordinate point indicated by the viewing position coordinates 1002 is the same two-dimensional plane used by the sound output control unit 110 for representing the viewable range in the viewable range list 802. Likewise, the same origin is used for the origin of the two-dimensional plane.

With this, the viewing position coordinates 1002 and the viewable range list 802 are both represented by coordinate points on the same two-dimensional plane, thus facilitating the comparison between the two.

Figure 10:
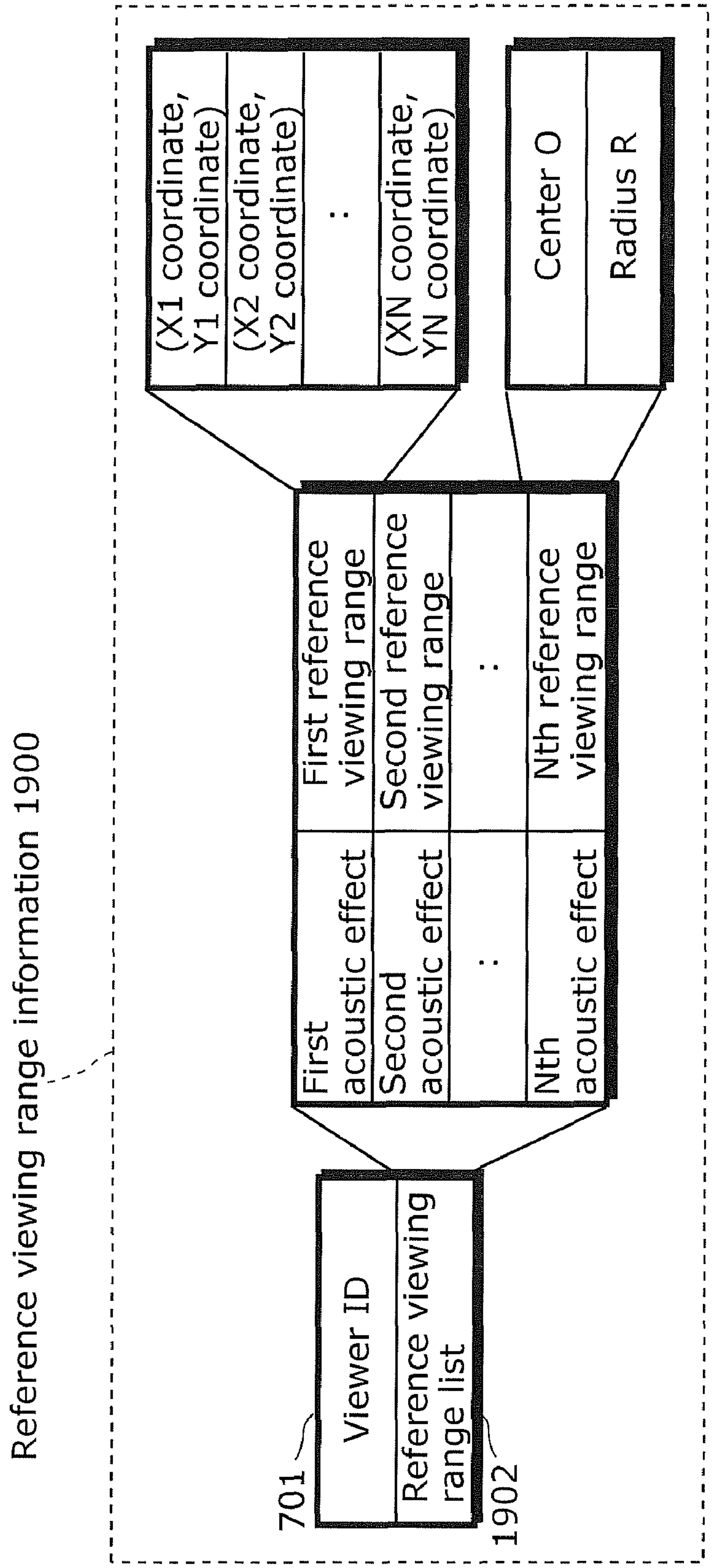
FIG. 10 is a diagram showing an example data configuration of reference viewing range information according to the embodiment of the present invention.

FIG. 10 is a diagram showing an example data configuration of reference viewing range information 1900. In FIG. 10, the reference viewing range information 1900 includes the viewer ID 701 and reference viewing range list 1902.

The reference viewing range information 1900 is information generated by the reference viewing range determination unit 202, based on the viewable range information 800.

As described above, the reference viewing range determination unit 202 transmits the acoustic effect simulation request information 700 to the simulation unit 150, and receives the viewable range information 800 including the result of the acoustic effect simulation from the sound output control unit 110.

Then, the reference viewing range determination unit 202 generates the reference viewing range information 1900 from the viewable range information 800.

For the viewer ID 701, the reference viewing range determination unit 202 stores the same value as the viewer ID 701 included in the viewable range information 800.

Note that in the present embodiment, the reference viewing range determination unit 202 stores, in the reference viewing range list 1902 without modification, a set of an acoustic effect and coordinates included in the viewable range list 802 in the viewable range information 800.

For example, as shown in FIG. 7, when the viewable range list 802 includes sets from a set of the first acoustic effect and first viewable range to a set of the Nth acoustic effect and Nth viewable range, each of the sets directly corresponds to a set of the first acoustic effect and first reference viewing range to a set of the Nth acoustic effect and Nth reference viewing range.

Note that a technique used for the reference viewing range determination unit 202 to generate the reference viewing range list 1902 from the viewable range list 802 is not limited to this, and another technique may be used. For example, only a set of the first acoustic effect and first viewable range, which is generated from a set of the first acoustic effect of highest priority and first viewable range, may be stored in the reference viewing range list 1902.

Thus, by setting only the set of the first acoustic effect of highest priority and first viewable range as the reference viewing range, the content reproduction apparatus 100 can respond to the request from the first viewer 112A even when the first viewer 112A only requests presentation of information that is based on the reference viewing range corresponding to the acoustic effect of highest priority.

In addition, there is another technique for generating the reference viewing range list 1902 from the viewable range list 802. For example, a set of the first acoustic effect and first reference viewing range may be generated from a set of the Nth acoustic effect of lowest priority and Nth viewable range, and only the generated set may be stored in the reference viewing range list 1902.

Thus, by setting only the set of the Nth acoustic effect of lowest priority and Nth viewable range as the reference viewing range, it is possible to represent information regarding a maximum viewing range that allows viewing of the content reproduced in the viewing window irrespective of acoustic effects. That is, even when the first viewer 112A requests presentation of such information, the content reproduction apparatus 100 can respond to the request.

Figure 11:
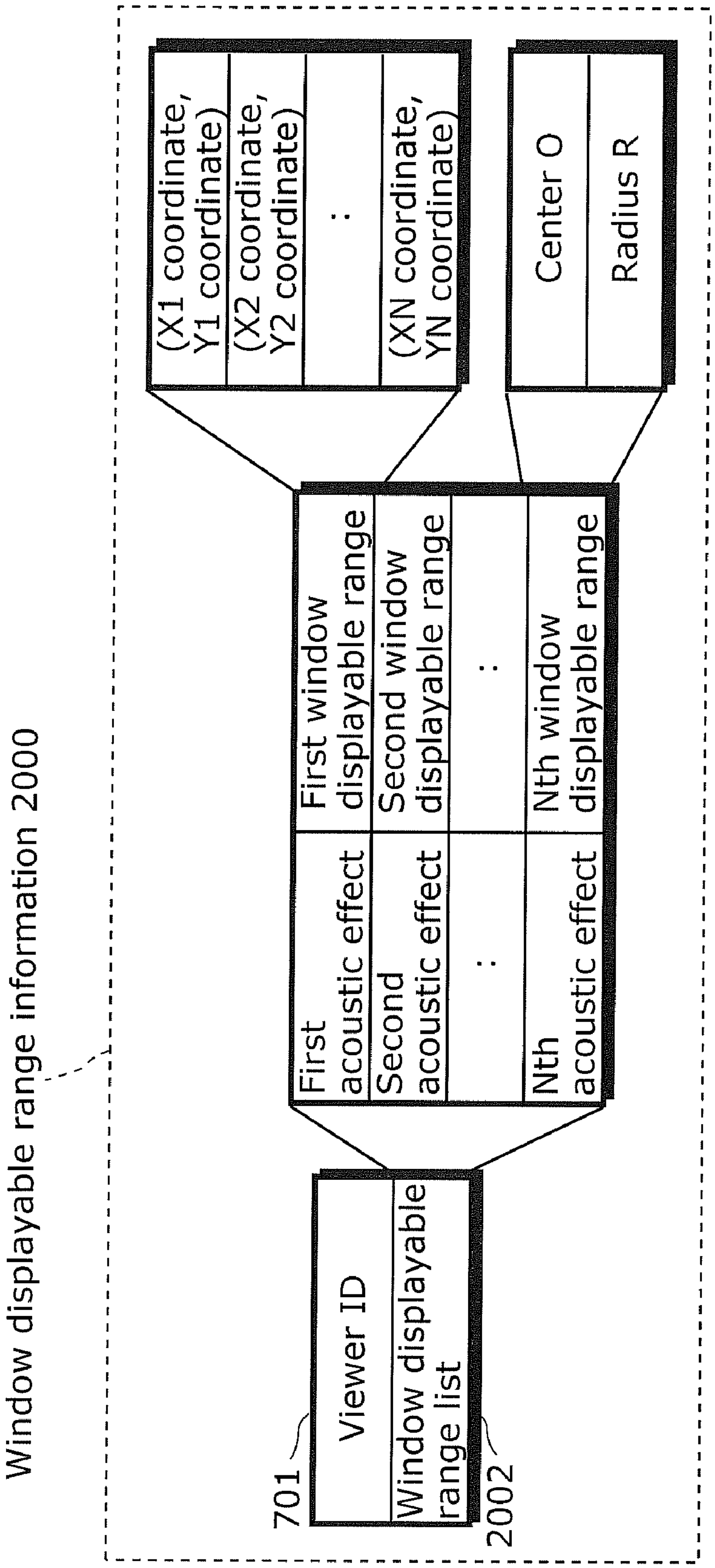
FIG. 11 is a diagram showing an example data configuration of window displayable range information according to the embodiment of the present invention.

FIG. 11 is a diagram showing an example data configuration of the window displayable range information 2000. In FIG. 11, the window displayable range information 2000 includes the viewer ID 701 and a window displayable range list 2002.

The window displayable range information 2000 is information generated by the window displayable range determination unit 203, based on the reference viewing range information 1900.

For the viewer ID 701, the window displayable range determination unit 203 stores the same value as the viewer ID 701 included in the reference viewing range information 1900.

In the window displayable range list 2002, the window displayable range determination unit 203 stores, along with a corresponding acoustic effect, a window displayable range which is generated from each of the reference viewing ranges included in the reference viewing range list 1902 in the reference viewing range information 1900.

That is, the window displayable range determination unit 203 stores, along with the first acoustic effect, the window displayable range generated from the first reference viewing range as a first window displayable range, and stores, along with a second acoustic effect, the window displayable range generated from the second reference viewing rage as a second window displayable range. The window displayable range determination unit 203 further generates, and stores in the window displayable range list 2002, window displayable ranges up to the Nth window displayable range corresponding to the Nth reference viewing range.

Here, first, the window displayable range determination unit 203 selects a target reference viewing range from at least one reference viewing range included in the reference viewing range list 1902. Furthermore, assuming that the viewer indicated by the viewer ID 701 is located at a given coordinate point within the target reference viewing range, the window displayable range determination unit 203 determines a range in which to display, on the display 106, a viewing window associated with the viewer located at this coordinate point.

The window displayable range determination unit 203 repeats this operation on all the coordinate points within the target reference viewing range, and determines, as the window displayable range, a sum of such ranges on the display 106 that are determined for the respective coordinate points within the target reference viewing range.

Subsequently, the window displayable range determination unit 203 selects another reference viewing range as the target reference viewing range and performs the same processing.

Accordingly, as shown in FIG. 11, the window displayable range determination unit 203 generates window displayable ranges from the first window displayable range to the Nth window displayable range corresponding, respectively, to the first reference viewing range to the Nth reference viewing range.

Note that the range in which to display, on the display 106, the viewing window to the viewer located at the given coordinate point is, for example, a range in which the viewing window is displayed, on the display 106, in front of the viewer located at this coordinate point.

Specifically, the window displayable range determination unit 203 defines the display range of the display 106 on a two-dimensional plane represented by an axis extended in a height direction and a horizontal axis perpendicular to the axis. In addition, the window displayable range determination unit 203 calculates a point at which a distance between the display 106 and the coordinate point at which the viewer is assumed to be located is shortest on the horizontal axis that is eye-level with the viewer. Furthermore, the window displayable range determination unit 203 determines, as the window displayable range corresponding to the viewer, a display range of a viewing window which includes the calculated point as a centroid.

Note that the eye level of the viewer may be previously set to a value such as "160 cm from floor", and a different value may be used according to each viewer.

In addition, the range in which to display, on the display 106, a viewing window to the viewer located at the given coordinate point is not limited to those described above. For another technique, for example, the range may be determined according to size of a visual field of the viewer. In addition, the viewer may determine, using the controller, an arbitrary position for the window displayable range determination unit 203.

Figure 12:
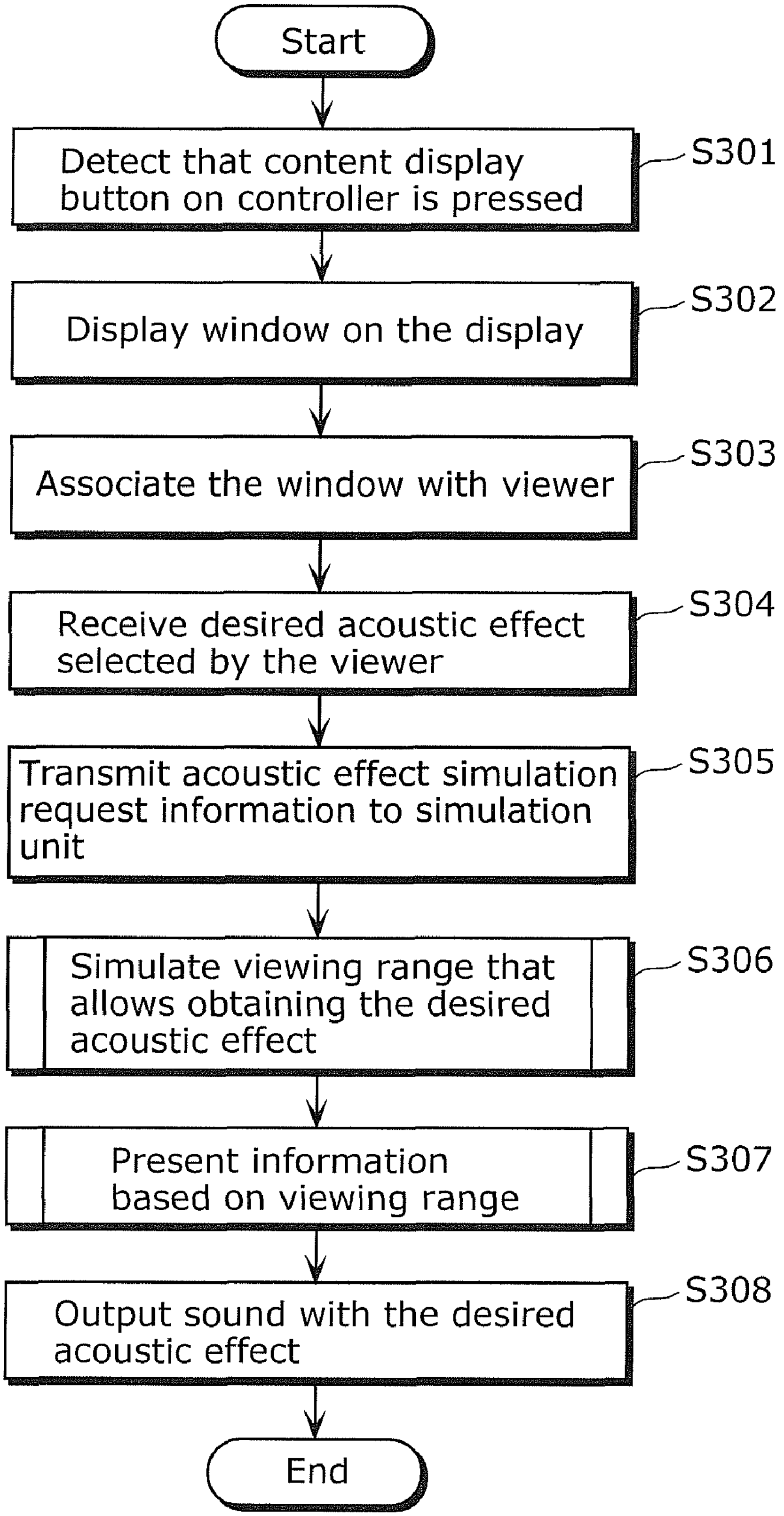
FIG. 12 is a flowchart showing a flow of processing from when the viewer requests to start viewing content to when the viewer starts viewing the content, according to the embodiment of the present invention.

Next, with reference to FIG. 12, the present embodiment will describe an operation from when the first viewer 112A requests to start viewing the content, and the content reproduction apparatus 100 presents information that is based on the viewing range that allows producing the acoustic effect desired by the first viewer 112A till when the first viewer 112A moves, according to the presented information, to the viewing position that allows the first viewer 112A to obtain the desired acoustic effect, and starts viewing the content.

First, the first viewer 112A presses down a content display button on the first controller 104*a*, so as to request to start viewing the content. The infrared ray receiving unit 109 detects that the button is pressed (step S301). At the same time, the content receiving unit 108 starts receiving the content, and the video output control unit 111 processes the video part of the received content and transmits the processed video part to the display control unit 205. Furthermore, the sound output control unit 110 controls the speaker apparatus 105 so that the speaker apparatus 105 outputs the sound part of the received content in the manner as initially set.

Next, the display control unit 205 displays, on the display 106, a window for displaying the content at the initially set position (step S302). Furthermore, the display control unit

205 assigns a unique window ID to the displayed window. This window ID is assumed to be unique among windows displayed on the display 106.

Note that the initial position at which the window is to be displayed is set for the display control unit 205 by, for example, the first viewer 112A using the first controller 104*a* prior to using the content reproduction apparatus 100. However, the initial position may be set at the time of manufacturing the content display control unit 200. Typically, the position at which the window is displayed in front of the viewer is set as the initial position of the window.

Next, the viewing window determination unit 201 associates the first viewer 112A with the window displayed in step S302, and holds a result of this association (step S303). As a result, the content displayed in the window and the first viewer 112A are also associated with each other.

In the present embodiment, the viewing window determination unit 201 associates the first viewer 112A with the window displayed in Step S302 by associating the controller ID assigned to the first controller 104*a* carried by the first viewer 112A with the window ID assigned to the window in step S302. The viewing window determination unit 201 further holds information regarding the association between the controller ID and the window ID.

In step S303 and onwards, an operation to be performed on the window displayed in step S302 is accepted only via the first controller 104*a* associated with the window. As described above, the window associated with the viewer by the viewing window determination unit 201 in step S303 is described as the viewing window.

Note that when a certain viewing window is closed by an operation by the viewer or the like, the viewing window determination unit 201 cancels the association between the window ID of the closed viewing window and the controller ID associated with the window.

Next, the first viewer 112A selects, using the first controller 104*a*, a desired acoustic effect for the content that is to be viewed in the viewing window. The reference viewing range determination unit 202 receives acoustic effect information that is information indicating a type of the acoustic effect selected by the first viewer 112A (step S304).

Note that the first viewer 112A can select one or more acoustic effects when there are plural selectable acoustic effects. Furthermore, when plural selectable acoustic effects are provided, the first viewer 112A can set priority for each of the acoustic effects.

In addition, the acoustic effect selectable by the first viewer 112A varies depending on the content associated with the first viewer 112A in step S303. For example, when reproducing certain content, monaural sound, stereo sound, and surround sound are selectable, but when reproducing other content, monaural sound and stereo sound are selectable.

Note that the acoustic effect selectable by the first viewer 112A may be changed according to the number of viewers currently using the content viewing system 10. For example, in the case where the first viewer 112A is the only viewer, monaural sound and stereo sound are selectable, but in the case where the second viewer 112B, in addition to the first viewer 112A, is using the content viewing system 10, an acoustic effect which prevents the sound of the content currently being viewed by the first viewer 112A from being heard by the second viewer 112B may also be selectable in addition to the monaural and stereo sound effects. In addition, in this case, an acoustic effect which prevents the sound of the content currently being viewed by the second viewer 112B from being heard by the first viewer 112A may also be selectable.

In the present embodiment, the first viewer 112A is assumed to select the desired acoustic effect from among three options, that is, surround sound, stereo sound, and monaural sound in order of priority.

Note that in step S304, instead of the first viewer 112A selecting, using the first controller 104*a*, the desired acoustic effect for the content displayed in the viewing window, the content reproduction apparatus 100 may automatically determine the desired acoustic effect for the content and priority for each of the acoustic effects.

Next, the reference viewing range determination unit 202 generates the acoustic effect simulation request information 700 based on the acoustic effect information selected by the first viewer 112A in step S304, and transmits the generated acoustic effect simulation request information 700 to the simulation unit 150 (step S305).

Here, for the viewer ID 701 in the acoustic effect simulation request information 700 transmitted to the simulation unit 150, the reference viewing range determination unit 202 sets the controller ID of the first controller 104*a* carried by the first viewer 112A. In addition, for the desired acoustic effect list 702, the reference viewing range determination unit 202 sets surround sound as the first acoustic effect, stereo sound as the second acoustic effect, and monaural sound as the third acoustic effect, based on the priority set by the first viewer 112A.

Note that in step S305, the reference viewing range determination unit 202 may set as the first acoustic effect, in the desired acoustic effect list 702 in the acoustic effect simulation request information 700, only the acoustic effect of highest priority set by the first viewer 112A. In this case, the simulation unit 150 need not perform acoustic effect simulation on the acoustic effect that is not of highest priority, thus reducing processing time for the simulation unit 150.

Next, the simulation unit 150 simulates the viewing range that allows the first viewer 112A to obtain the desired acoustic effect, based on the acoustic effect simulation request information 700 received from the reference viewing range determination unit 202 (step S306). The simulation unit 150 further transmits a simulation result to the sound output control unit 110. The sound output control unit 110 generates the viewable range information 800 based on the simulation result that is received, and transmits the viewable range information 800 to the reference viewing range determination unit 202.

Next, the reference viewing range determination unit 202 receives the viewable range information 800 from the sound output control unit 110. Furthermore, the reference viewing range determination unit 202, the window displayable range determination unit 203, the current viewing position determination unit 204, and the display control unit 205 all operate in collaboration to present to the viewer 112A, with reference to the viewable range information 800, the information that is based on the viewable range that allows the first viewer 112A to obtain the desired acoustic effect (step S307).

According to the information that is presented, the first viewer 112A moves to a viewing position that allows the first viewer 112A to obtain the desired acoustic effect.

Lastly, the sound output control unit 110 controls the speaker apparatus 105 so that the speaker apparatus 105 outputs to the first viewer 112A the acoustic effect desired by the first viewer 112A (step S308).

During this operation, the sound output control unit 110 obtains the reference viewing range information 1900 from the reference viewing range determination unit 202, and obtains coordinates of the current viewing position of the first viewer 112A from the display control unit 205. Then, the sound output control unit 110 checks, in order, whether the current viewing position of the first viewer 112A falls within one of the reference viewing ranges from the first reference viewing ranges to the Nth reference viewing ranges. As a result of this checking, the sound output control unit 110 controls the speaker apparatus 105 so that the speaker apparatus 105 outputs the acoustic effect corresponding to the reference viewing range within which the current viewing position of the first viewer 112A falls first.

Figure 13:
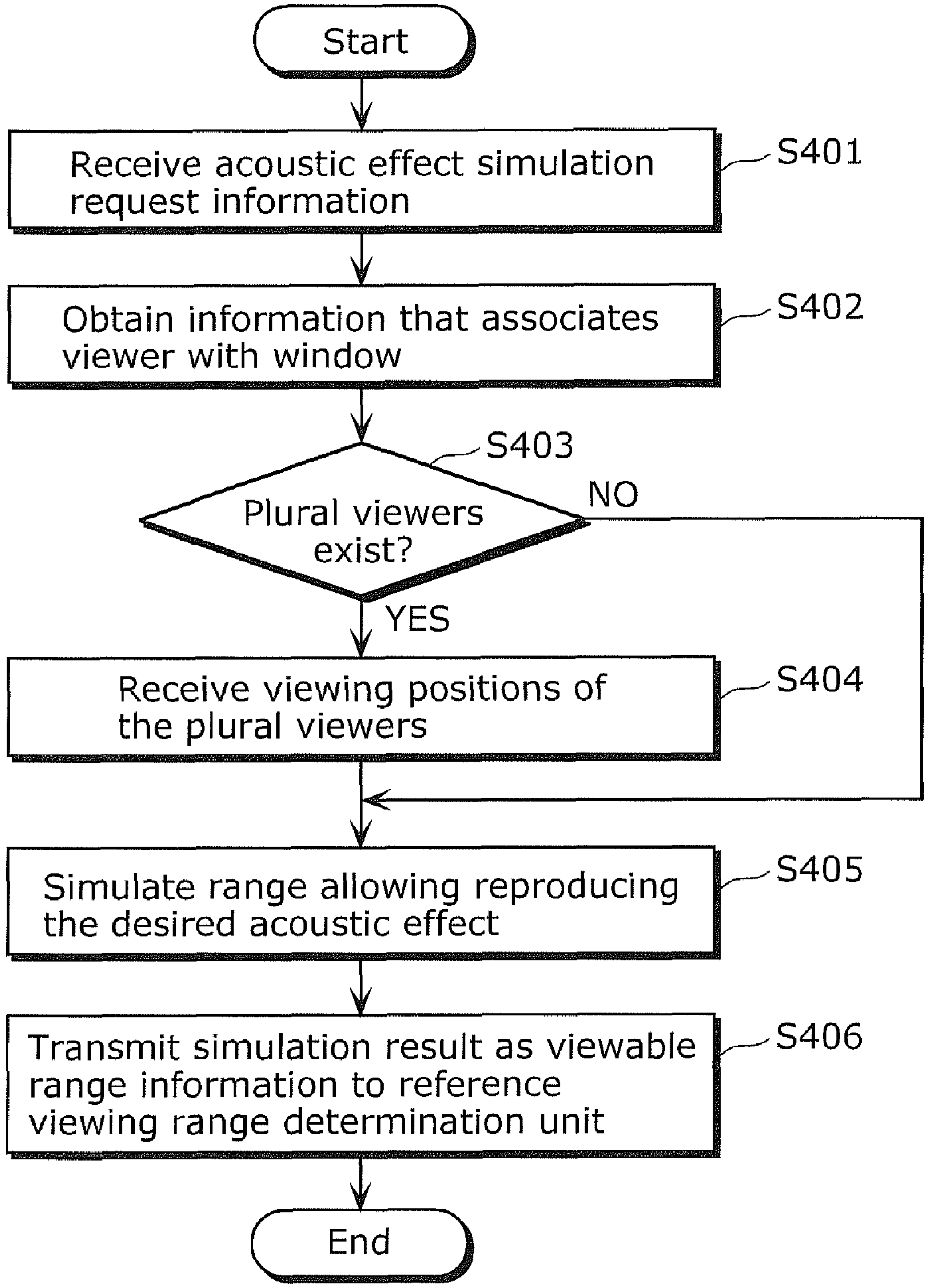
FIG. 13 is a flowchart showing a flow of processing when a simulation unit calculates the viewable range according to the embodiment of the present invention.

Next, a detailed operation in step S306 in FIG. 12 will be described with reference to FIG. 13.

First, the simulation unit 150 receives the acoustic effect simulation request information 700 from the reference viewing range determination unit 202 (step S401).

Next, the simulation unit 150 obtains information regarding the association between the first viewer 112A and the window, which is held by the viewing window determination unit 201, and obtains a list of controller IDs already associated with the window (step S402).

Next, the simulation unit 150 determines whether or not there is any viewer other than the first viewer 112A (step S403). Here, in the present embodiment, the controller ID of the controller carried by the viewer is used for the viewer ID indicating the viewer. That is, the controller ID that is already associated with the window and obtained in step S402 indicates the viewer currently using the content viewing system 10.

First, the controller ID indicating the first viewer 112A is stored at the viewer ID 701 in the acoustic effect simulation request information 700 received in step S401. Accordingly, in step S403, the simulation unit 150 checks whether or not a value other than the controller ID indicating the first viewer 112A and stored at the viewer ID 701 is included in the list obtained in step S402, which is the list of the controller IDs already associated with the window.

As a result of this checking, when there is a value other than the controller ID indicating the first viewer 112A, the simulation unit 150 determines that there is a viewer other than the first viewer 112A (hereinafter referred to as "other viewer") (YES in step S403), and when there is no value other than the controller ID indicating the first viewer 112A, the simulation unit 150 determines that there is no other viewer (NO in step S403).

In step S403, when determining that there is the other viewer (YES in step S403), the simulation unit 150 obtains the current viewing positions of the first viewer 112A and the other viewer (step S404).

To perform this operation, first, the simulation unit 150 generates the viewing position measurement request information 900 which includes, for the viewer ID 901, the controller ID indicating the first viewer 112A, and transmits the generated viewing position measurement request information 900 to the position calculation unit 107.

The simulation unit 150 further selects one of the controller IDs that indicates the other viewer from the list, which is obtained in step S402 and is a list of the controller IDs already associated with the window, and generates, and transmits to the position calculation unit 107, the viewing position measurement request information 900 which includes this controller ID for the viewer ID 901.

Note that a piece of viewing position measurement request information 900 may include the controller ID indicating the first viewer 112A and the controller ID indicating the other viewer.

The position calculation unit 107, having received such pieces of viewing position measurement request information 900, calculates the viewing position of the first viewer 112A, stores each result in the viewing position information 1000, and transmits the viewing position information 1000 to the simulation unit 150. Furthermore, the position calculation unit 107 also calculates the viewing position for the other viewer, stores the result in the viewing position information 1000, and transmits the viewing position information 1000 to the simulation unit 150.

The simulation unit 150, having received these pieces of viewing position information 1000, obtains the current viewing positions of the first viewer 112A and the other viewer based on the viewing position coordinates 1002 included therein.

Note that the simulation unit 150 performs the simulation processing described below when determining that there is no viewer other than the first viewer 112A (NO in step S403).

The simulation unit 150 performs simulation regarding whether or not the predetermined simulation range includes a range so that allows reproducing the designated acoustic effect to the viewer indicated by the viewer ID 701, that is, the first viewer 112A, for each of the acoustic effects set in the desired acoustic effect list 702 in the acoustic effect simulation request information 700 received in step S401 (step S405).

In the present embodiment, simulation is performed regarding whether or not the entire space of the room in which the content is viewed includes a range that allows reproducing, for the first viewer 112A, each of the effects of surround sound, stereo sound, and monaural sound.

Note that this simulation uses, as described earlier, static information such as the shape of the room in which the content viewing system 10 is provided and dynamic information that is the type of the acoustic effect selected by the first viewer 112A (surround sound effect and so on).

Here, when the first viewer 112A and the other viewer are using the content viewing system 10 as the viewers, the simulation unit 150 uses the current viewing positions of the first viewer 112A and the other viewer, which are obtained in step S404, as a parameter for acoustic effect simulation.

Specifically, the simulation unit 150 determines, from the viewing positions of the first viewer 112A and the other viewer, whether the first viewer 112A is located right or left to the other viewer as one faces the display 106. Furthermore, when determining that the first viewer 112A is on the right, the simulation unit 150 determines the number and positions of the speakers to be assigned to the viewer "a", with reference to the assignment table 121 (see FIG. 5). In addition, when determining that the first viewer 112A is on the left, the simulation unit 150 determines the number and positions of the speakers to be assigned to the viewer "b", with reference to the assignment table 121.

The simulation unit 150 uses the number and positions, thus determined, of the speakers assigned to the first viewer 112A in performing acoustic effect simulation (step S405) on the first viewer 112A.

Note that when, for example, performing the acoustic effect simulation on the first viewer 112A, the simulation unit 150 may exclude, in order to simplify such acoustic effect simulation, the viewing position and a peripheral range of the other viewer from the target range of the acoustic effect simulation. In addition, the simulation unit 150 may limit the target range of the acoustic effect simulation to the peripheral range of the first viewer 112A. Thus, narrowing of the target range of the simulation improves efficiency in calculation processing in the simulation unit 150.

Next, the simulation unit 150 further transmits the result of the simulation to the sound output control unit 110. The sound output control unit 110 generates the viewable range information 800 based on the simulation result, and transmits the generated viewable range information 800 to the reference viewing range determination unit 202 (step S406).

In the present embodiment, in an order of the acoustic effects stored in the desired acoustic effect list 702 in the acoustic effect simulation request information 700, the viewable range list 802 in the viewable range information 800 includes: information indicating surround sound as the first acoustic effect; information indicating stereo sound as the second acoustic effect; and information indicating monaural sound as the third acoustic effect.

For the viewer ID 701 in the viewable range information 800, stored is the same value as the viewer ID in the acoustic effect simulation request information 700 received in step S401, that is, the controller ID of the first controller 104*a* carried by the first viewer 112A.

Next, a detailed operation in step S307 in FIG. 12 will be described with reference to FIG. 14.

First, the reference viewing range determination unit 202 receives the viewable range information 800 from the sound output control unit 110 (step S501).

Next, the reference viewing range determination unit 202 determines whether or not there is any viewable range, with reference to the viewable range list 802 in the viewable range information 800 received in step S501 (step S502).

In step S502, when determining that no viewable range exists (NO in step S502), the display control unit 205 presents to the first viewer 112A that no viewable range exists (step S510).

In the present embodiment, the display control unit 205 displays text or an image on the display 106, so as to present that there is no viewable range. However, for another technique, the display control unit 205 may instruct the sound output control unit 110 to present the information by sound, such as sounding an alarm using the speaker apparatus 105. Alternatively, for example, the display control unit 205 may also instruct the content reproduction apparatus 100 to present the information by illumination, such as flashing light using an illumination apparatus (not shown) connected to the content reproduction apparatus 100 by wired or wireless connections.

In step S502, when the reference viewing range determination unit 202 determines that a viewable range exists (YES in step S502), the reference viewing range determination unit 202 determines the reference viewing range from the viewable range list 802 included in the viewable range information 800 and generates the reference viewing range information 1900 (step S503).

In the present embodiment, the reference viewing range information 1900 includes, for the viewer ID 701, the controller ID of the first controller 104*a*, and the reference viewing range list 1902 includes: information indicating surround sound as the first acoustic effect, along with a first viewable range as the first reference viewing range; information indicating stereo sound as the second acoustic effect, along with a second viewable range as a second reference viewing range; and information indicating monaural sound as the third acoustic effect, along with a third viewable range as a third reference viewing range.

Next, the current viewing position determination unit 204 transmits the viewing position measurement request information 900 to the position calculation unit 107, requesting to calculate a relative position of the first viewer 112A with respect to the display 106.

The current viewing position determination unit 204 receives the result of the calculation as the viewing position information 1000, and determines the current viewing position of the first viewer 112A based on the viewing position information 1000 (step S504).

Note that in the case of the current viewing position of the first viewer 112A has been obtained in step S404, the processing in step S504 is omitted.

In the present embodiment, the current viewing position determination unit 204 determines, as the current viewing position of the first viewer 112A, the viewing position coordinates 1002 included in the received viewing position information 1000. However, with an error in the viewing position coordinates 1002 considered, a given range including the position indicated by the viewing position coordinates 1002 may be determined to be the current viewing position of the first viewer 112A.

The value that the current viewing position determination unit 204 stores for the viewer ID 901 in the viewing position measurement request information 900 may be the same as the value stored for the viewer ID 701 in the viewable range information 800 received in step S501.

Next, the display control unit 205 compares the current viewing position of the first viewer determined in step S504 and the first reference viewing range in the reference viewing range list 1902 in the reference viewing range information 1900 generated by the reference viewing range determination unit 202 in step 503. Based on this comparison, the display control unit 205 determines whether or not the current viewing position of the first viewer 112A falls within the reference viewing range (step S505).

In step S505, when the current viewing position of the first viewer 112A completely falls within the first reference viewing range (YES in step S505), the display control unit 205 presents to the first viewer 112A that the first viewer 112A is located within the viewable range that allows obtaining the desired acoustic effect (step S511).

In the present embodiment, the display control unit 205 displays text or an image on the display 106 to present that the first viewer 112A is located within the viewable range that allows obtaining the desired acoustic effect. However, for example, for another technique, for example, the display control unit 205 may instruct the sound output control unit 110 to present the information by sound, such as sounding an alarm using the speaker apparatus 105, or the display control unit 205 may instruct to present the information by illumination, such as flashing light using an illumination apparatus not shown.

Note that step S511 may be performed when at least part of the current viewing position of the first viewer 112A falls within the reference viewing range. In this case, step S506 is performed only when the current viewing position of the first viewer 112A does not fall within the reference viewing range at all.

In the present embodiment, in step S505, when even a part of the current viewing position of the first viewer 112A does not fall within the reference viewing range at all (NO in step S505), the display control unit 205 presents to the first viewer 112A, move instruction information which guides the first viewer 112A to the viewing range that allows obtaining the desired acoustic effect (step S506).

Figure 16:
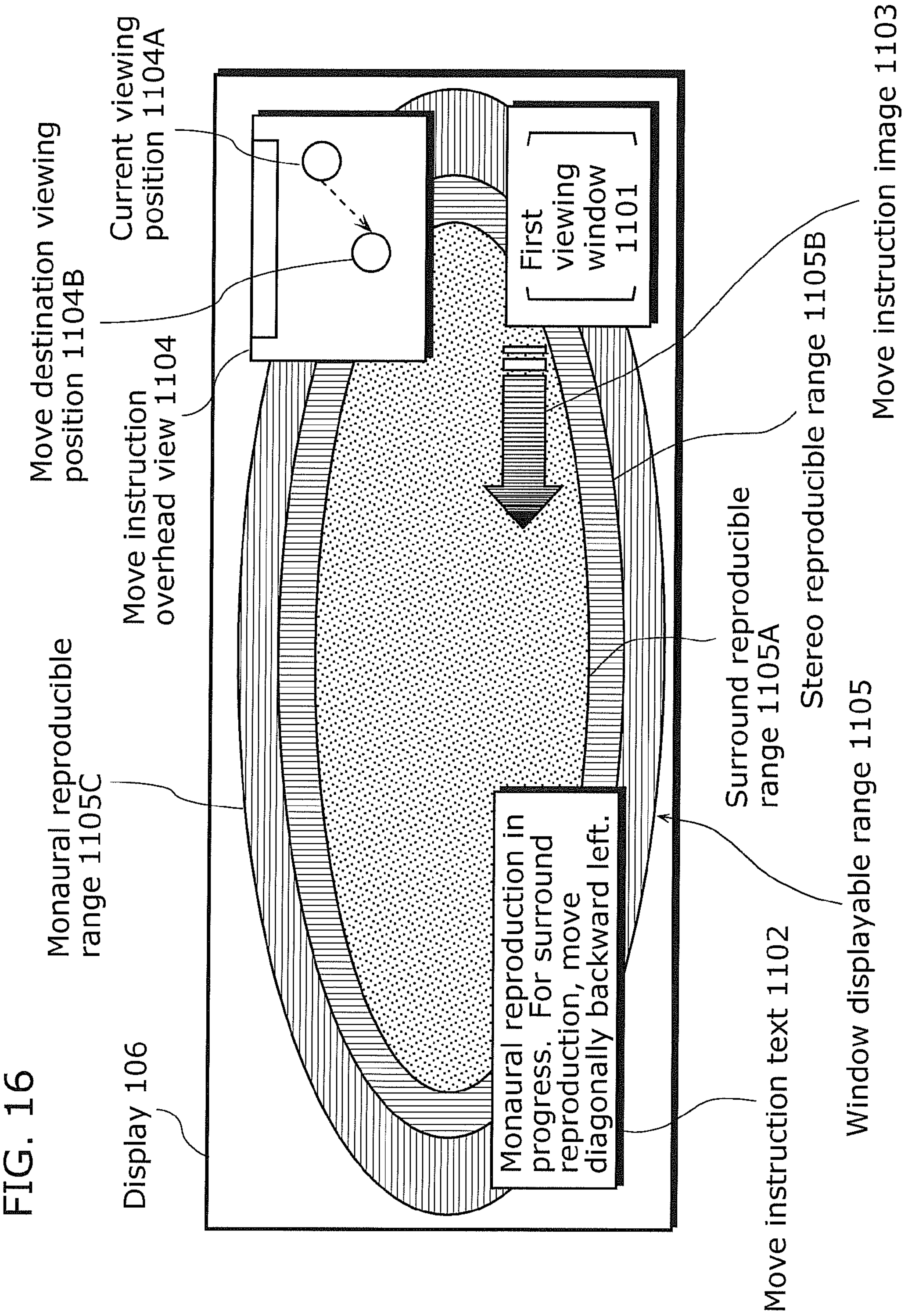
FIG. 16 is a diagram showing a first example of presentation of the move instruction information and the window displayable range according to the embodiment of the present invention.
Figure 17:
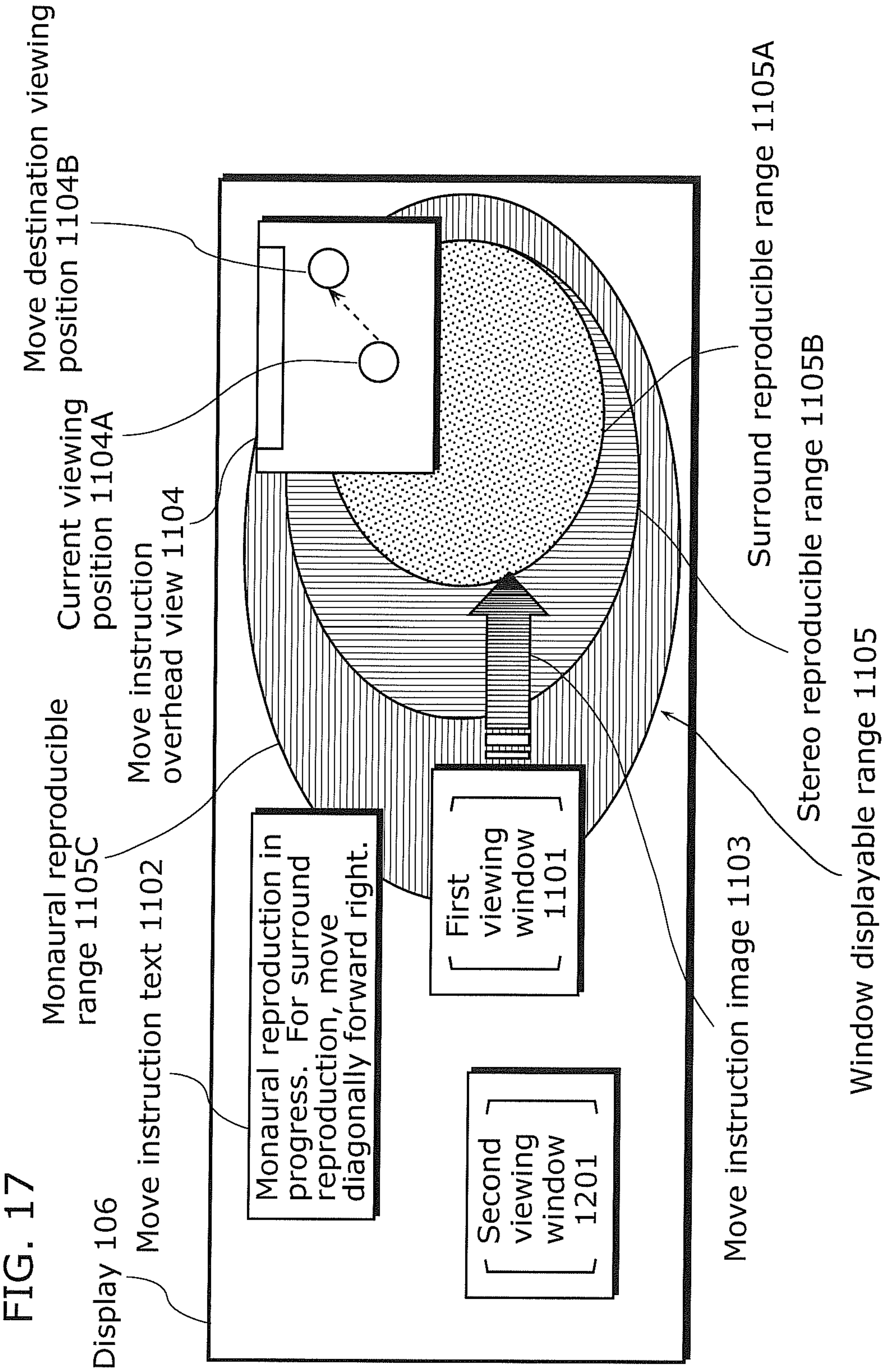
FIG. 17 is a diagram showing a second example of presentation of the move instruction information and the window displayable range according to the embodiment of the present invention.
Figure 19:
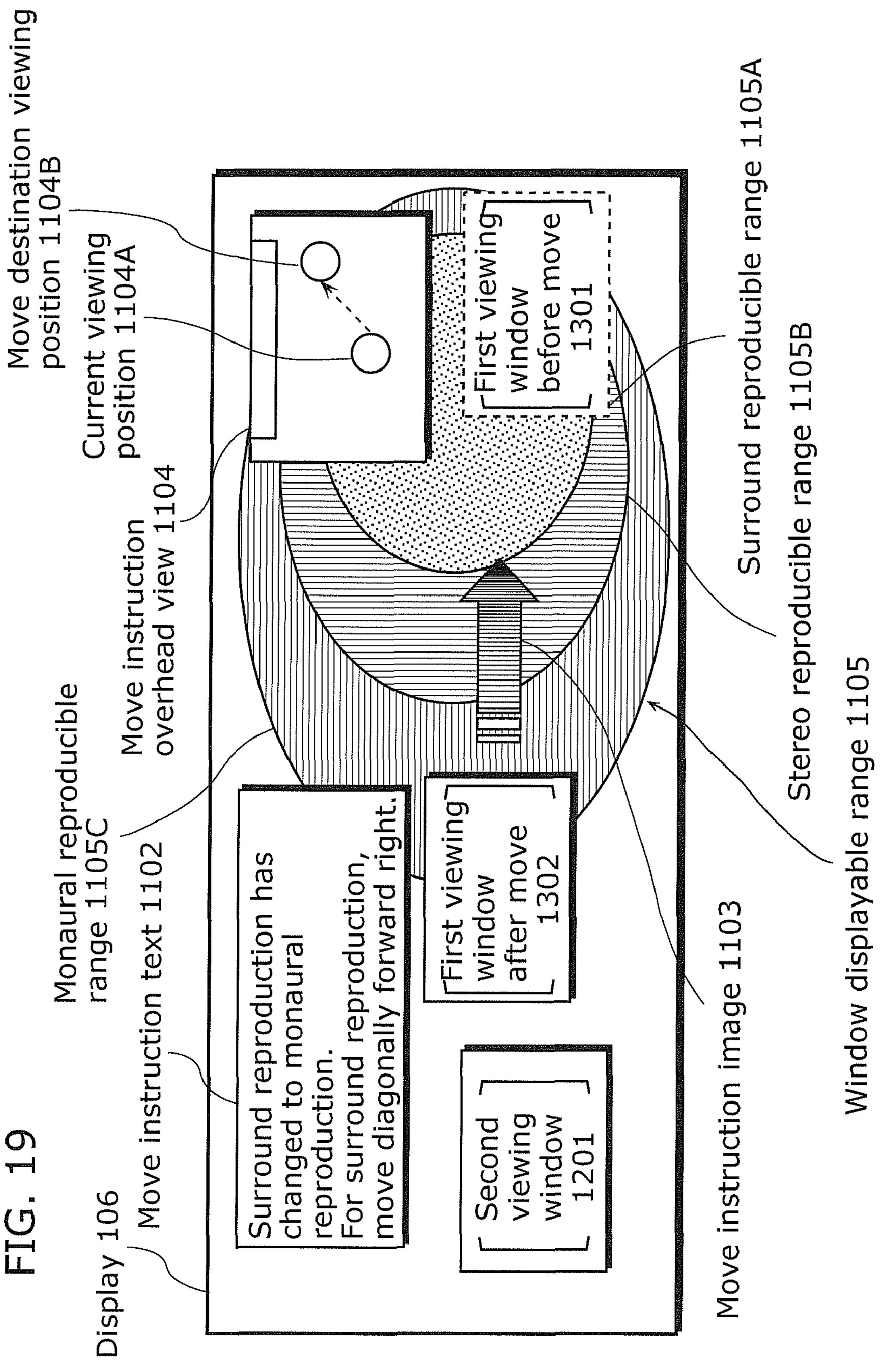
FIG. 19 is a diagram showing a third example of presentation of the move instruction information and the window displayable range according to the embodiment of the present invention.

This move instruction information in the present embodiment includes, as shown in FIGS. 16, 17, and 19 that are to be described below, move instruction text 1102, a move instruction image 1103, and a move instruction overhead view 1104.

The first viewer 112A, by following the move instruction information, is able to move to the viewing position that allows obtaining the desired acoustic effect. However, the move instruction information is not limited to this, and the same advantageous effect can be produced by the display control unit 205 instructing the illumination apparatus not shown to light up the viewable range with illumination.

Next, the window displayable range determination unit 203 determines the window displayable range based on the reference viewing range information 1900 generated by the reference viewing range determination unit 202 in step S503, and generates the window displayable range information 2000 (step S507).

In the present embodiment, the first window displayable range is assumed to be the window displayable range corresponding to the first reference viewing range that allows viewing with the surround sound effect. The second window displayable range is assumed to be the window displayable range corresponding to the second reference viewing range that allows viewing with the stereo sound effect. The third window displayable range is assumed to be the window displayable range corresponding to the third reference viewing range that allows viewing with the monaural sound effect.

Next, the display control unit 205 displays the window displayable range on the display 106, based on the window displayable range information 2000 generated by the window displayable range determination unit 203 in step S507 (step S508).

However, the first window displayable range indicated in the window displayable range list 2002 is to be displayed at the forefront, the second window displayable range is to be displayed at the next front, and the third window displayable range is to be displayed at the furthest back.

An example of the window displayable range displayed on the display 106 will be described below with reference to FIGS. 16, 17, and 19.

Next, when the first viewer 112A moves according to the move instruction information presented in step S506 and the window displayable range displayed on the display 106 in step S507, the display control unit 205 changes the display position of the viewing window so that the viewing window follows the first viewer 112A that is moving (step S509).

The first viewer 112A is able to move to the viewing position that allows the first viewer 112A to obtain the desired acoustic effect, by moving so that the viewing window following the first viewer 112A falls within the window displayable range displayed on the display 106 in step S507.

Thus, the display control unit 205 changes the display position of the viewing window so that the viewing window is constantly displayed in front of the first viewer 112A that is moving.

Specifically, where the display 106 is defined as a two-dimensional plane represented by a height axis and a horizontal axis perpendicular to the height axis, the display control unit 205 displays the viewing window having a centroid coincident with a point at which the distance between the first viewer 112A and the display 106 is shortest on the horizontal axis that is eye-level with the first viewer 112A. With this, the viewing window is displayed in front of the first viewer 112A.

Note that the display control unit 205 regularly checks whether or not the viewing position has changed not only with the first viewer 112A but also with all the viewers, irrespective of the timing of step S509. When the result of the checking indicates a change in the viewing position of a certain viewer, the display control unit 205 further changes the display position of the viewing window so that the viewing window associated with the viewer is located in front of the viewer.

Thus, in order to detect whether or not each of the viewers has moved, the display control unit 205 obtains, from the position calculation unit 107, the viewing positions of all the viewers associated with the viewing window in step S303 (see FIG. 12) at regular intervals.

The display control unit 205 further compares, for the given viewer, a latest viewing position obtained from the position calculation unit 107 and a preceding viewing position obtained before the latest viewing position, and when the difference is equal to or above a predetermined threshold, determines that the viewer has moved.

With measurement accuracy of the position calculation unit 107 considered, the threshold used for comparing the viewing positions and the intervals at which to obtain the viewing positions from the position calculation unit 107 may be set for the display control unit 205 at the time of manufacturing the content reproduction apparatus 100, or the first viewer 112A may set such threshold and intervals for the display control unit 205, using the first controller 104*a*.

The display control unit 205 takes the following procedure to obtain the viewing position of each of the viewers from the position calculation unit 107. First, the display control unit 205 obtains, from the viewing window determination unit 201, a list of controller IDs already associated with the respective windows. Next, the display control unit 205 selects one of the controller IDs included in the obtained list, generates the viewing position measurement request information 900 including the selected controller ID for the viewer ID 901, and transmits the generated viewing position measurement request information 900 to the position calculation unit 107.

Next, the position calculation unit 107, having received the viewing position measurement request information 900, calculates the viewing position of the viewer corresponding to the selected controller ID, stores the result in the viewing position information 1000, and transmits the viewing position information 1000 to the display control unit 205.

The display control unit 205, having received the viewing position information 1000, obtains the viewing position of the viewer corresponding to the designated controller ID from the viewing position coordinates 1002. The above processing is repeatedly performed on every controller ID included in the list of the controller IDs already associated with each of the plural windows.

Note that in step S509, after the first viewer 112A has moved, the display control unit 205 need not automatically change the display position of the viewing window. For example, the same advantageous effect can be produced when the first viewer 112A, using the first controller 104*a*, indicates to the display control unit 205 the position at which the viewing window is to be displayed on the display 106, and then the display control unit 205 moves the viewing window to the position designated by the first viewer 112A.

Note that the display control unit 205 in step S509 may be controlled so that the viewing window does not move out of the window displayable range. With this, the viewing window does not move even when the first viewer 112A moves beyond the position that allows obtaining the desired acoustic effect. With this, the first viewer 112A is also able to find the viewing range that allows obtaining the desired acoustic effect, according to the range in which the viewing window moves.

Furthermore, by virtually limiting the range of movement of the first viewer 112A, the acoustic effect being produced for the first viewer 112A does not interfere with the acoustic effect being obtained by the other viewer such as the second viewer 112B.

Note that after performing step S509 or step S308, the presentation of information, such as the move instruction information and the window displayable range that have been presented by the content display control unit 200 to the first viewer 112A so as to guide the first viewer 112A to the viewing position that allows obtaining the desired acoustic effect, may be automatically terminated.

In addition, the presentation may be terminated after the first viewer 112A instructs, using the first controller 104*a*, the content display control unit 200 to terminate the presentation. This is not limited to the information presented by the operation shown in FIG. 14 but is applicable to information presented by another operation shown in another figure.

Figure 14:
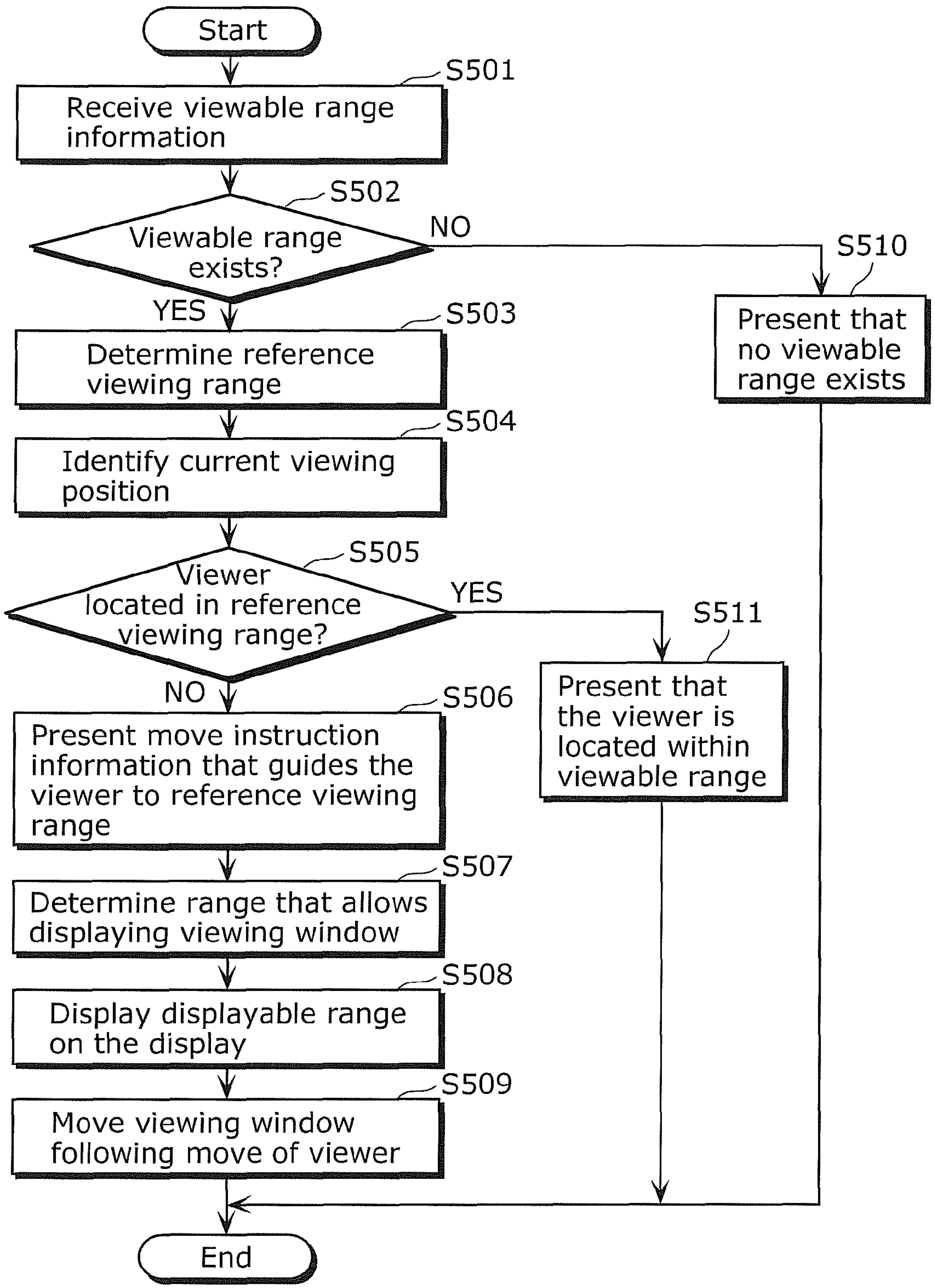
FIG. 14 is a flowchart showing a flow of processing when the content reproduction apparatus presents, to the viewer, move instruction information and a window displayable range according to the embodiment of the present invention.
Figure 15:
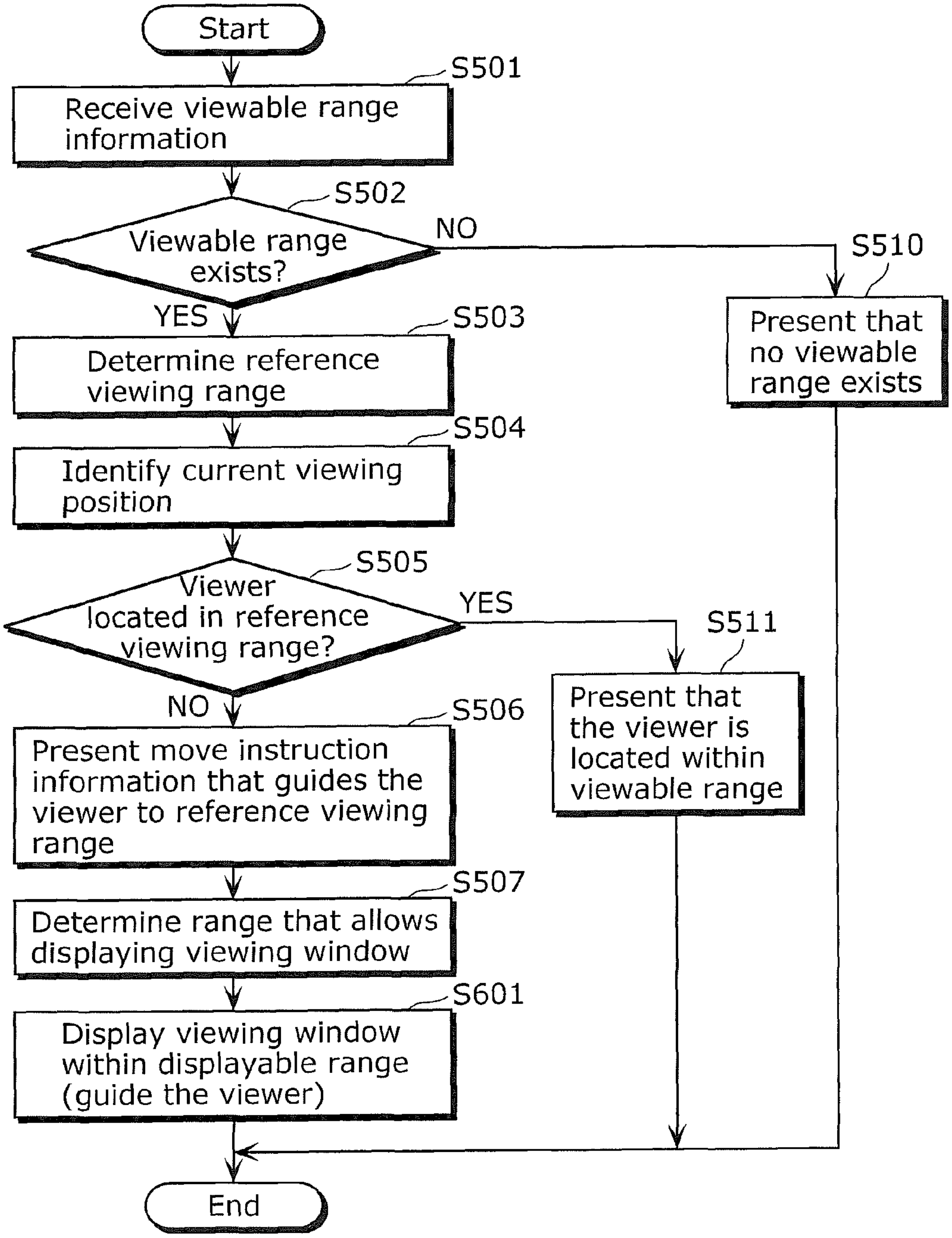
FIG. 15 is a flowchart showing a flow of processing when the content reproduction apparatus displays a viewing window within the window displayable range according to the embodiment of the present invention.

The operation shown in step S307 in FIG. 12 may include respective processing steps shown in FIG. 15, instead of including respective processing steps shown in FIG. 14. In FIG. 15, steps S508 and S509 in FIG. 14 are replaced with step S601.

The following will describe step S601. Note that the processing in FIG. 15, except for the processing in step S601, is the same as the processing in FIG. 14 assigned with the same reference signs, and thus the description thereof will be omitted.

After performing step S507, based on the window displayable range information 2000 generated by the window displayable range determination unit 203 in S507, the display control unit 205 displays the viewing window on the display 106 so that at least a part of the viewing window corresponding to the first viewer 112A is displayed within the first window displayable range indicated in the window displayable range list 2002 (step S601).

Specifically, the display control unit 205 displays the viewing window on the display 106 so that the centroid of the viewing window falls within the first window displayable range.

The first viewer 112A moves to the position at which the viewing window displayed on the display 106 in step S601 can be seen in front, with reference to the move instruction information presented in step S506. As a result, the first viewer 112A moves to the viewing position that allows obtaining the desired acoustic effect.

FIG. 16 shows a diagram showing an example of the move instruction information displayed on the display 106 by the display control unit 205 in step S506 shown in FIG. 14, and a window displayable range 1105 displayed on the display 106 by the display control unit 205 in step S508 shown in FIG. 14.

The first viewing window 1101 is a viewing window associated with the first viewer 112A. The move instruction information includes: move instruction text 1102, a move instruction image 1103, and a move instruction overhead view 1104.

The move instruction text 1102 presents a string which indicates in which direction the first viewer 112A should move to reach the viewing position that allows the first viewer 112A to obtain the desired acoustic effect; that is, more specifically, the surround sound effect that is the first acoustic effect. In addition, as shown by the figure, information regarding the acoustic effect currently being obtained by the first viewer 112A or information regarding the acoustic effect desired by the first viewer 112A may be presented.

The move instruction image 1103 is an image indicating in which direction the first viewer 112A should move to reach the viewing position that allows the first viewer 112A to obtain the desired acoustic effect, and is, for example, an arrow as shown in FIG. 16.

The move instruction overhead view 1104 is an image indicating in which direction the first viewer 112A should move to reach the viewing position that allows the first viewer 112A to obtain the desired acoustic effect, and has, in particular, a feature of using an overhead view of the room in which the content is viewed.

In FIG. 16, the move instruction overhead view 1104 is a diagram of the room in which the content is viewed as one looks down the room from above, and an upper portion of the move instruction overhead view 1104 corresponds to the position at which the display 106 is disposed.

The move instruction overhead view 1104 shows: a current viewing position 1104A indicating the current position of the first viewer 112A, and a move destination viewing position 1104B indicating the viewing position to which the first viewer 112A should move in order to obtain the desired acoustic effect.

In FIG. 16, the window displayable range 1105 is made up of: a surround reproducible range 1105A that is the first window displayable range; a stereo reproducible range 1105B that is the second window displayable range; and a monaural reproducible range 1105C that is the third window displayable range.

As shown in the figure, the display control unit 205 may display, on the display 106, the window displayable range 1105 after shaping the content to be presented in a form more understandable to the first viewer 112A such as an elliptical shape. Furthermore, the display control unit 205 may present, by text or image, along with the window displayable range 1105, information regarding the sound effect to be obtained when the first viewer 112A is located within the reference viewing range.

For example, a string "surround reproducible range" is displayed on the display 106 so as to overlap with the display of the surround reproducible range 1105A. Furthermore, the display control unit 205 may change a color or shape of the display on the display 106 according to each window displayable range so as to facilitate recognition by the viewer. For example, the display control unit 205 may display the first window displayable range in a red elliptical shape, and may display the second window displayable range in a blue rectangular shape.

FIG. 17 shows a diagram showing another example of the move instruction information displayed on the display 106 by the display control unit 205 in step S506 in FIG. 14 and the window displayable range 1105 displayed on the display 106 by the display control unit 205 in step S508 in FIG. 14.

Compared to the content displayed on the display 106 shown in FIG. 16, the content displayed on the display 106 shown in FIG. 17 additionally includes the second viewing window 1201 associated with the second viewer 112B.

For example, it is assumed that while the first viewer 112A is viewing the content, the second viewer 112B appears in front of the display 106 from left as one faces the display 106.

When this happens, the simulation unit 150 performs acoustic effect simulation on the first viewer 112A so that the acoustic effect currently being reproduced for the second viewer 112B is not interfered.

Specifically, the simulation unit 150 determines the first viewer 112A as the viewer "a" and the second viewer 112B as the viewer "b" with reference to the assignment table 121 (see FIG. 5). The simulation unit 150 further performs acoustic effect simulation on the first viewer 112A, using the number and positions of the speakers corresponding to "a" indicated by the assignment table 121.

The result shows that compared to FIG. 16, the window displayable range 1105 is narrower and located closer to the right on the display 106, away from the second viewing window 1201.

Next, in the present embodiment, the operation of the content reproduction apparatus 100 in the case where, after the operation shown in FIG. 12, the first viewer 112A moves in the middle of viewing the content will be described with reference to FIG. 18.

First, the display control unit 205 determines whether or not the viewing position of the first viewer 112A has changed (step S1501). Note that as described in step S509 in FIG. 14, the display control unit 205 regularly checks whether or not the viewing position has changed for all the viewers, and this checking operation is common to steps S509 and S1501.

In the case where the viewing position is not changed (NO in step S1501), the display control unit 205 subsequently continues to regularly check whether the viewing position of the first viewer 112A has changed. In the case where the viewing position has changed (YES in step S1501), the content reproduction apparatus 100 presents to the first viewer 112A, information that is based on the viewable range that allows the first viewer 112A to obtain the desired acoustic effect (step S307).

For example, when the first viewer 112A, standing almost in the middle of the room and obtaining the surround sound effect, moves closer to a right wall of the room, the move instruction text 1102, the window displayable range 1105, and so on as shown in FIG. 16 are displayed on the display 106.

Note that, for example, the content display control unit 200 holds the acoustic effect simulation result previously obtained for the first viewer 112A (the result of step S306 in FIG. 12). The content display control unit 200 performs the display control described above using the acoustic effect simulation result that it holds.

In addition, the content display control unit 200 need not use the previous acoustic effect simulation result. For example, the content display control unit 200 may perform the display control described above using the result of the processing (steps S305 and S306 in FIG. 12) involved in the acoustic effect simulation that is re-performed by the simulation unit 150 and so on.

In addition, in the case where the viewing position of the first viewer 112A has changed, whether or not to perform the display of the information that is based on the viewing range (step S307) may be set for the content reproduction apparatus 100, for example, by the first viewer 112A using the first controller 104*a*.

Figure 18:
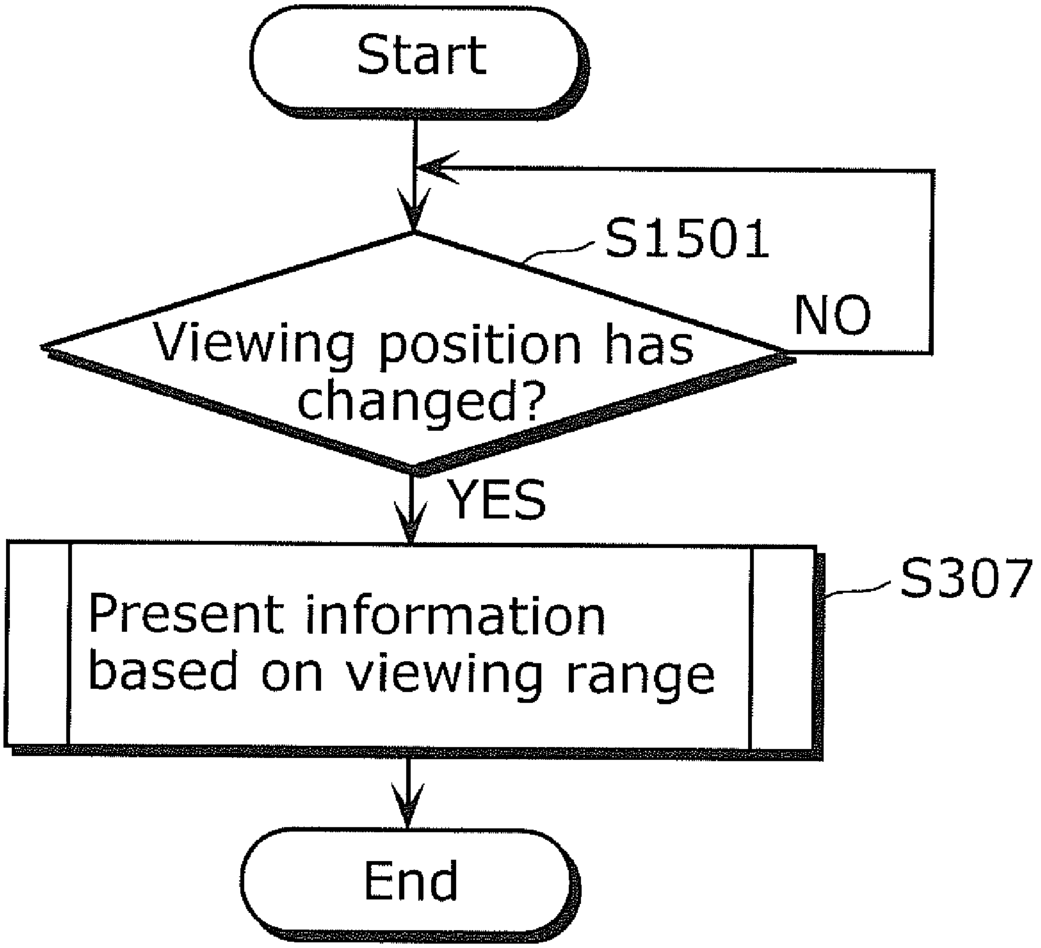
FIG. 18 is a flowchart showing a flow of processing by the content display control unit when the viewer moves in the middle of viewing the content according to the embodiment of the present invention.

Note that in the display of the information that is based on the viewing range (step S307) in FIG. 18, the presentation of the move instruction information and the window displayable range that are presented to the first viewer 112A is terminated with timing when the first viewer 112A finishes moving and stops.

With this, the move instruction information and the window displayable range are presented only when the first viewer 112A is moving. However, the first viewer 112A may be allowed to set the timing to terminate the presentation for the content reproduction apparatus 100, using the first controller 104*a*.

The content reproduction apparatus 100 presents the information that is based on the acoustic effect desired by the first viewer 112A even when the first viewer 112A moves in the middle of viewing the content as shown in FIG. 18. With this, even when the first viewer 112A moves in the middle of viewing the content, the first viewer 112A is able to readily find the viewable range that allows obtaining the desired acoustic effect, and is able to move into the viewable range that allows obtaining the desired acoustic effect.

FIG. 19 is a diagram showing an example of the move instruction information displayed in step S506 in FIG. 14 and the window displayable range 1105 displayed in step S508 in FIG. 14, both of which are displayed on the display 106 by the display control unit 205 in the case where, after the operation shown in FIG. 12, the first viewer 112A moves in the middle of viewing the content.

Compared to the content displayed on the display 106 shown in FIG. 17, the content displayed on the display 106 shown in FIG. 19 additionally includes, instead of the first viewing window 1101, a first viewing window before move 1301 and a first viewing window after move 1302. In addition, compared to FIG. 17, FIG. 19 shows a feature in the content presented by the move instruction text 1102.

In FIG. 19, in addition to the string indicating in which direction the first viewer 112A should move to reach the viewing position that allows the first viewer 112A to obtain the desired acoustic effect, the move instruction text 1102 presents that the acoustic effect obtainable by the first viewer 112A has changed, as well as information regarding the changed acoustic effect.

Next, in the present embodiment, the operation of the content reproduction apparatus 100 in the case where, after the operation shown in FIG. 12, the first viewer 112A has changed the desired acoustic effect for the content in the middle of viewing the content will be described with reference to FIG. 20.

First, a case is assumed where the first viewer 112A, using the first controller 104*a*, has selected some acoustic effect in the middle of viewing the content. In this case, the reference viewing range determination unit 202 receives, via the infrared ray receiving unit 109, the acoustic effect information that is based on the selection by the first viewer 112A. The reference viewing range determination unit 202 further determines, with reference to this acoustic effect information, whether or not the acoustic effect selected, prior to viewing the content, by the first viewer 112A in step S304 in FIG. 12 has changed (step S1601).

In the case where the acoustic effect has not been changed (NO in step S1601), the operation is terminated. In the case where the acoustic effect has been changed (YES in step S1601), the content reproduction apparatus 100 presents to the first viewer 112A, the information that is based on the viewable range that allows the first viewer 112A to obtain the desired acoustic effect (step S307).

Note that, as in the processing shown in FIG. 18, this display control may be performed by the content display control unit 200 using a previous acoustic effect simulation result already obtained, or may be performed using the result of the acoustic effect simulation that is re-performed.

Figure 20:
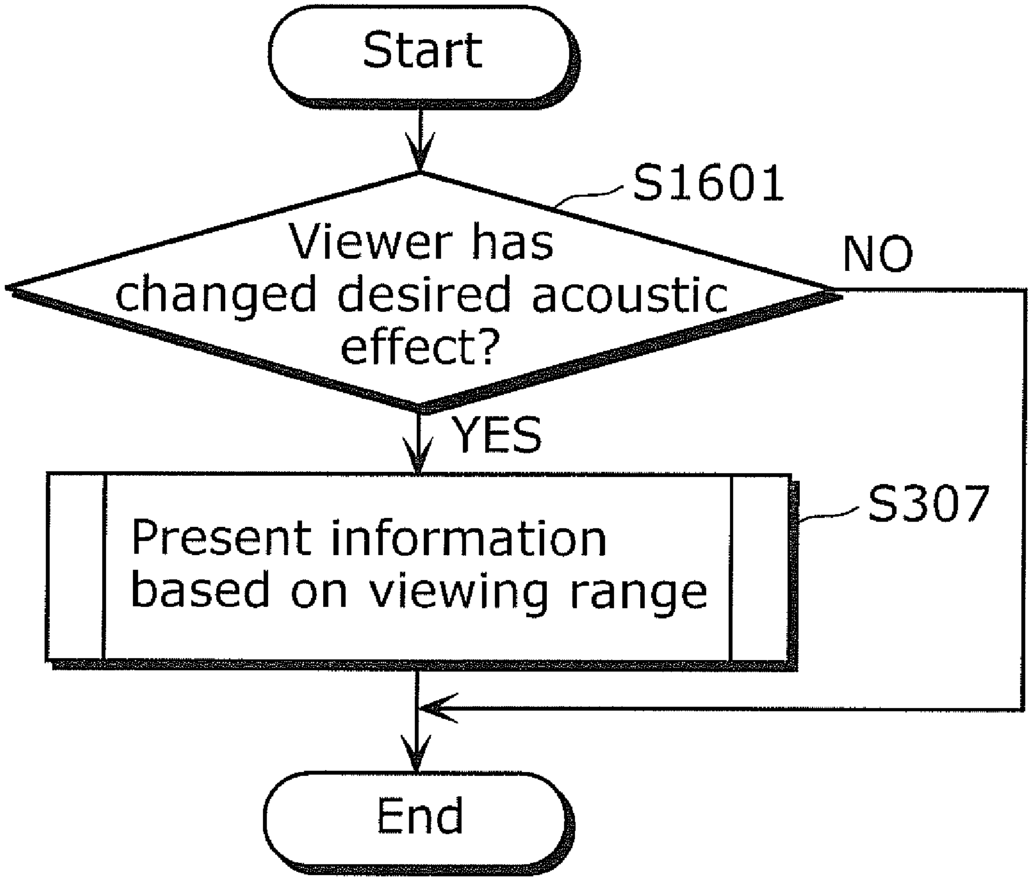
FIG. 20 is a flowchart showing a flow of processing performed by the content display control unit when the viewer changes the desired acoustic effect in the middle of viewing the content according to the embodiment of the present invention.

The content reproduction apparatus 100 presents the information that is based on the acoustic effect desired by the first viewer 112A even in the case where, as shown in FIG. 20, the first viewer 112A has changed the desired acoustic effect for the content in the middle of viewing the content.

With this, the first viewer 112A is able to readily find that the change of the desired acoustic effect has resulted in change in the viewing range that allows obtaining the desired sound effect as well as what viewing range allows obtaining the desired acoustic effect, and is able to readily move to the viewing range that allows obtaining the desired acoustic effect.

Next, in the present embodiment, the operation of the content reproduction apparatus 100, after the operation shown in FIG. 12, in the case of change in a status of the viewing window other than the viewing window corresponding to the first viewer 112A (hereinafter, referred to as the "other viewing window") will be described with reference to FIG. 21.

First, the display control unit 205 regularly checks whether or not the status of the other viewing window has changed (step S1701). In the case where the status of the other viewing window has not changed (NO in step S1701), the display control unit 205 continues to check the status of the other viewing window.

In the case where the status of the other viewing window has changed (YES in step S1701), the content reproduction apparatus 100 performs steps S305, S306, and S1702. However, since steps S305 and S306 indicate the operations assigned with the same reference signs in FIG. 12, the descriptions thereof are omitted.

Note that the case where the status of the other viewing window has changed is where, for example, the second viewer 112B has suspended viewing the content. In this case, the second viewing window 1201 that has been displayed on the display 106 up to the point in time is closed. That is, the size of the second viewing window 1201 is changed to zero.

In addition, in this case, the first viewer 112A is the only viewer using the content viewing system, and this causes change in the combination of speakers assigned to the first viewer 112A and the first viewing window 1101 (see FIG. 5). Accordingly, the content reproduction apparatus 100 re-performs the processing involved in the acoustic effect simulation for the first viewer 112A and the presentation of the information that is based on the viewable range, using new conditions (such as the number and position of the speakers indicated by the combination of speakers after change) (steps S305, S306, and S1702 in FIG. 21).

In addition, in the case where the second viewing window 1201 moves as a result of the second viewer 112B moving, the range that allows display of the first viewing window 1101 changes accordingly. Therefore, also in this case, the content reproduction apparatus 100 may re-perform, using new conditions, the processing involved in the acoustic effect simulation for the first viewer 112A and the presentation of the information that is based on the viewing range.

In this case, for example, the simulation unit 150 adjusts (by increasing or decreasing) the number of speakers assigned to the first viewer 112A according to the positional relationship between the position of the second viewer 112B after move and the position of the first viewer 112A at the point in time, based on the information indicated by the assignment table 121. In addition, acoustic effect simulation (step S306) is newly performed using this adjusted number of speakers and so on.

Thus, in the case where the status of the other viewing window has changed, in most cases except for the case of subtle change, the viewable range is changeable for each of the N acoustic effects desired by the first viewer 112A. That is, the reference viewable range that is determined based on the viewable range is also changeable.

Figure 21:
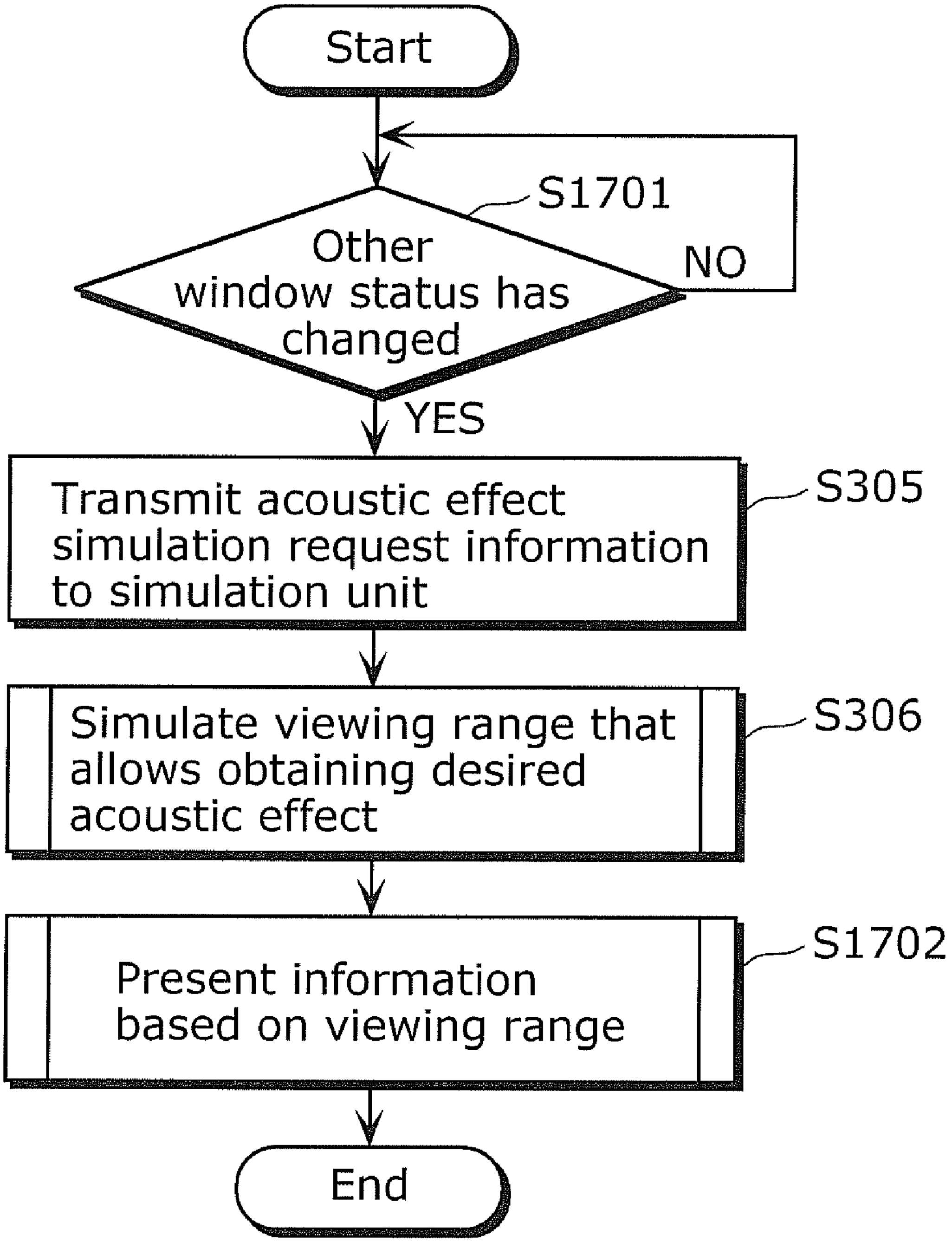
FIG. 21 is a flowchart showing a flow of processing performed by the content display control unit in the case of change in a status of the viewing window, according to the embodiment of the present invention.

Next, a detailed operation in step S1702 as shown in FIG. 21 will be described with reference to FIG. 22. However, since steps S501, S503, and S507 in FIG. 22 indicate the operations assigned with the same reference signs in FIG. 14, the descriptions thereof are omitted.

First, the content reproduction apparatus 100 performs steps S501 and S503. Next, the display control unit 205 presents to the first viewer 112A that the reference viewing range has changed (step S1802).

Figure 23:
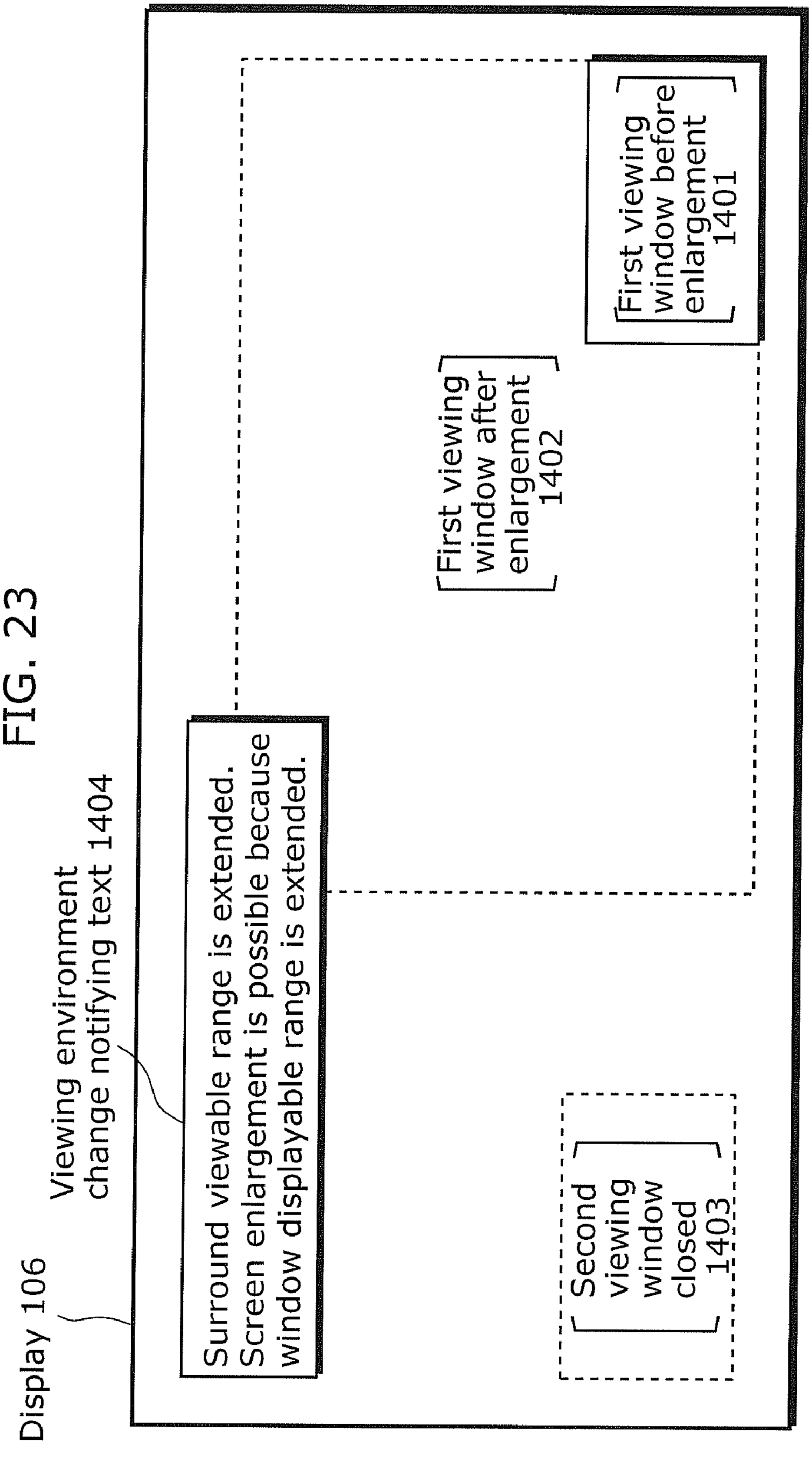
FIG. 23 is a diagram showing an example of presentation in the case of change in a status of another viewing window that is not the viewing window corresponding to a first viewer, according to the embodiment of the present invention.

In the present embodiment, the display control unit 205 notifies to the display 106, by text, that the reference viewing range has changed. A viewing environment change notifying text 1404 in FIG. 23 shows an example of presentation in step S1802. FIG. 23 will be described in detail later.

Note that in step S1802, for another technique of presentation to the first viewer 112A, the presentation may be performed, for example, using an image, or the display control unit 205 may instruct the sound output control unit 110 to present the information by sound, such as sounding an alarm using the speaker apparatus 105. Alternatively, the display control unit 205 may instruct to present the information by illumination, such as flashing light using an illumination apparatus not shown in the figure.

Next, the window displayable range determination unit 203 performs step S507.

Next, with reference to the window displayable range list 2002 in the window displayable range information 2000 generated by the window displayable range determination unit 203 in step S507, the display control unit 205 checks whether any window displayable range has changed compared to the preceding window displayable range that is generated before the window displayable range (step S1803).

Note that since the reference viewing range corresponding to the acoustic effect such as the surround sound effect changes, the window displayable range corresponding to the reference viewing range also changes in principle. However, in some cases, the window displayable range does not change, such as the case of a minor amount of change in the reference viewing range. Accordingly, this determination processing (step S1803) is performed.

In step S1803, when there is no window displayable range that has changed (NO in step S1803), the processing is terminated.

In step S1803, when any window displayable range has changed (YES in step S1803), the display control unit 205 presents to the first viewer 112A that the window displayable range has changed (step S1804).

In the present embodiment, the display control unit 205 presents, by text on the display 106, that the window displayable range has changed. The viewing environment change notifying text 1404 in FIG. 23 shows an example of presentation in step S1804. FIG. 23 will be described in detail later.

Note that in step S1804, for another technique of presentation to the first viewer 112A, the presentation may be performed using, for example, an image, or the display control unit 205 may instruct the sound output control unit 110 to present the information by sound, such as sounding an alarm using the speaker apparatus 105. Alternatively, the display control unit 205 may instruct to present the information by light, such as flashing light using an illumination apparatus not shown in the figure.

Next, the display control unit 205 changes the size of the viewing window corresponding to the first viewer 112A in accordance with the window displayable range that has changed (step S1805). During this operation, the display control unit 205 changes the size of the viewing window in accordance with the size of the window displayable range within which the centroid of the viewing window corresponding to the first viewer 112A falls, among the window displayable ranges from the first to the Nth.

The display control unit 205 enlarges the viewing window when the window displayable range is enlarged, and reduces the viewing window when the window displayable range is reduced. In addition, the display control unit 205, when changing the size of the viewing window, changes the size so that the viewing window is located in front of the first viewer 112A, with the least movement possible of the first viewer 112A from the current viewing position. For example, the display control unit 205 changes the size of the viewing window with the centroid of the viewing window kept at a current position, or changes the size of the viewing window with one corner of the viewing window fixed at a current position.

Note that after performing step S1805, the content reproduction apparatus 100 may perform, for example, steps S506 and 508 shown in FIG. 15 in order, and may guide the first viewer 112A so as to allow the first viewer 112A to be readily located in front of the enlarged viewing window.

The content reproduction apparatus 100 presents the information that is based on the acoustic effect desired by the first viewer 112A, even in the case where the status of the viewing window other than the viewing window corresponding to the first viewer 112A shown in FIG. 21 has changed. With this, the first viewer 112A is able to readily find that the viewing range that allows obtaining the desired acoustic effect has changed as well as what viewing range allows the first viewer 112A to obtain the desired sound effect, and is able to readily move to the viewing range that allows obtaining the desired acoustic effect.

Furthermore, the first viewer 112A is also able to readily find that the size of the viewing window can be changed, and the content reproduction apparatus 100 can automatically change the size of the viewing window.

Figure 22:
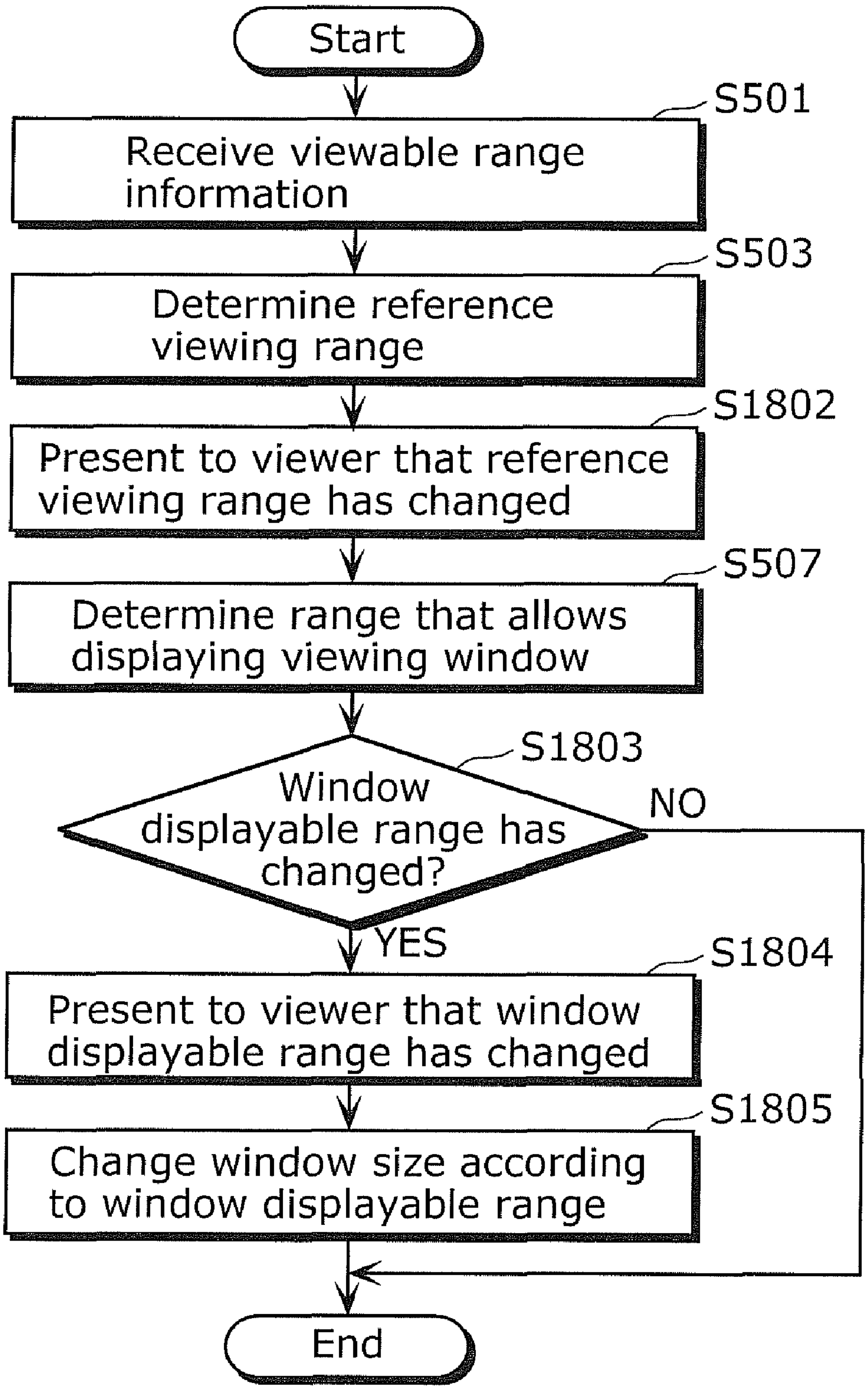
FIG. 22 is a flowchart showing a detailed flow of processing for presenting information in FIG. 21.

FIG. 23 shows a diagram of an example of information displayed on the display 106 by the display control unit 205 in steps S1802 and S1804 in FIG. 22, in the case where, after the operation shown in FIG. 12, the status of the viewing window other than the viewing window corresponding to the first viewer 112A has changed.

A first viewing window before enlargement 1401 is the viewing window corresponding to the first viewer 112A before the display control unit 205 performs enlargement. A first viewing window after enlargement 1402 is the viewing window corresponding to the first viewer 112A after the display control unit 205 performs enlargement. A second viewing window closed 1403 indicates a position at which the viewing window associated with the second viewer 112B and closed by the display control unit 205 has been displayed.

The viewing environment change notifying text 1404 is a string which notifies that the reference viewing range and the window displayable range, which have been displayed on the display 106 by the display control unit 205 in steps S1802 and S1804 in FIG. 22, have changed.

In FIG. 23, the viewing environment change notifying text 1404 further includes a string related to the acoustic effect currently being obtained by the first viewer 112A, and a string which is related to size change and which indicates that enlargement of the viewing window is possible.

Note that in the present embodiment, the operation of the content viewing system 10 for the first viewer 112A has been described, but the content viewing system 10 performs the same operation not only for the first viewer 112A but also for the other viewer such as the second viewer 112B.

In addition, in the present embodiment, the simulation unit 150 performs the same processing involved in the acoustic effect simulation, but the same advantageous effect can be produced even when the processing is performed by a constituent element of the content display control unit 200, such as the sound output control unit 110 or the reference viewing range determination unit 202.

Note that the present invention has been described based on the embodiment above, but it goes without saying that the present invention is not limited by the above embodiment. The following case is also included in the present invention.

(1) The content reproduction apparatus 100 described above is specifically a computer system including: a microprocessor, a read-only memory (ROM), a random access memory (RAM), a hard disk unit, a display unit, a keyboard, a mouse, and so on.

In the RAM or the hard disk unit, a computer program is stored. The content reproduction apparatus 100 performs its function with the microprocessor operating in accordance with the computer program. The computer program here is configured with a combination of a plurality of instruction codes indicating instructions to the computer in order to achieve a predetermined function.

(2) A part or all of the constituent elements of the content reproduction apparatus 100 may include a system Large Scale Integration (LSI). The system LSI, which is a super-multifunctional LSI manufactured by integrating constituent elements on a single chip, is specifically a computer system which includes a microprocessor, a ROM, and a RAM. In the RAM, a computer program is stored. The system LSI performs its function with the microprocessor operating in accordance with the computer program.

(3) A part or all of the constituent elements of the content reproduction apparatus 100 may include an IC card or single module that is attachable and removable for the content reproduction apparatus 100. The IC card or the module is a computer system including a microprocessor, a ROM, and a RAM. The IC card or the module may include the super-multifunctional LSI described above. The IC card or the module performs its function with the microprocessor operating in accordance with the computer program. The IC card or the module may also be tamper-resistant.

(4) The present invention may be realized as the methods described above. In addition, these methods may also be realized as a computer program which causes a computer to execute these methods, and may also be a digital signal representing the computer program.

In addition, according to an implementation of the present invention, the computer program or the digital signal may be recorded on a computer-readable recording medium, such as a flexible disc, a hard disk, a CD-ROM, an MO, a DVD, a DVD-ROM, a DVD-RAM, a Blu-ray Disc (BD), and a semiconductor memory. In addition, the present invention may also be realized as the digital signal recorded on such recording media.

In addition, the present invention may also be realized as transmitting the computer program or the digital signal via a telecommunication line, wired or wireless communication links, a network represented by the Internet, data broadcasting, and so on.

In addition, the present invention may also be a computer system including a microprocessor and memory in which the computer program is stored, and the microprocessor may operate in accordance with the computer program.

In addition, the program or the digital signal may also be executed by another independent computer system, by recording and transferring the program or the digital signal, or by transferring the program or the digital signal via the network and so on.

(5) Each of the above embodiment and variations may be combined together.

INDUSTRIAL APPLICABILITY

A content reproduction apparatus according to an implementation of the present invention performs simulation on a viewing range that allows a viewer to obtain a desired acoustic effect, and can thereby present, by text, an image, an overhead view, or the like, a direction in which the viewer should move to reach the viewing range that allows the viewer to obtain the desired acoustic effect, when the viewer is not located in the viewable range that allows the viewer to obtain the desired acoustic effect. Furthermore, the content reproduction apparatus according to an implementation of the present invention can present information regarding a range in which the viewer should be located, so as to allow the viewer to move the viewing window to the position appropriate for the viewing within the range that allows the viewer to obtain the desired acoustic effect.

With this, the viewer is able to readily find the viewing range that allows obtaining the desired acoustic effect. Thus, the content reproduction apparatus according to an implementation of the present invention is applicable as a content reproduction apparatus or the like used in: a content viewing system including an extra-large screen display whose viewing range covers the entire room to include both a range that allows reproducing the desired acoustic effect for the viewer and a range that does not allow such reproduction; and a content viewing system that allows plural viewers to view different content items at the same time.

REFERENCE SIGNS LIST

10 Content viewing system
100 Content reproduction apparatus
101 Position information obtaining apparatus
102 Content transmission apparatus
103 Broadcast receiving antenna
104*a* First controller
104*b* Second controller
105 Speaker apparatus
106 Display
107 Position calculation unit
108 Content receiving unit
109 Infrared ray receiving unit
110 Sound output control unit
111 Video output control unit
112A First viewer
112B Second viewer
120 Storage unit
121 Assignment table
122 Assignment unit
123 Output unit
150 Simulation unit
200 Content display control unit
201 Viewing window determination unit
202 Reference viewing range determination unit
203 Window displayable range determination unit
204 Current viewing position determination unit
205 Display control unit
700 Acoustic effect simulation request information
701, 901 Viewer ID
702 Desired acoustic effect list
800 Viewable range information
802 Viewable range list
900 Viewing position measurement request information
1000 Viewing position information
1002 Viewing position coordinates
1101 First viewing window
1102 Move instruction text
1103 Move instruction image
1104 Move instruction overhead view
1104A Current viewing position
1104B Move destination viewing position
1105 Window displayable range
1105A Surround reproducible range
1105B Stereo reproducible range
1105C Monaural reproducible range
1201 Second viewing window
1301 First viewing window before move
1302 First viewing window after move
1401 First viewing window before enlargement
1402 First viewing window after enlargement
1403 Second viewing window closed
1404 Viewing environment change notifying text
1900 Reference viewing range information
1902 Reference viewing range list
2000 Window displayable range information
2002 Window displayable range list

The invention claimed is:

1. A content reproduction apparatus connected to a display and speakers, said content reproduction apparatus comprising:

a content display control unit configured to cause the display to display a first window for displaying video of first content to a first viewer and a second window for displaying video of second content to a second viewer;

a sound output control unit configured to cause, among the speakers, at least one speaker assigned to the first content to output sound of the first content, and to cause, among the speakers, at least one speaker assigned to the second content to output sound of the second content;

a viewable range calculation unit configured to calculate a viewable range, using (i) information indicating a size of a predetermined range, (ii) the number and a position of the at least one speaker assigned to the first content, and (iii) the number of channels required for a predetermined acoustic effect, the viewable range being included in the predetermined range and being a range in which the first viewer can hear the sound of the first content with the predetermined acoustic effect included in at least one acoustic effect that is obtained from the first content and is available for reproducing the first content; and a presentation control unit configured to output information that is based on the viewable range calculated by said viewable range calculation unit, so as to present the information to the first viewer.

2. The content reproduction apparatus according to claim 1, wherein said viewable range calculation unit is configured to calculate a plurality of viewable ranges each of which is calculated for a corresponding one of a plurality of acoustic effects that are available for reproducing the first content and include the predetermined acoustic effect, said content reproduction apparatus further comprises a reference viewing range determination unit configured to determine at least one viewable range as a reference viewing range from among the plurality of viewable ranges calculated by said viewable range calculation unit, and said presentation control unit is configured to output information that is based on the at least one viewable range determined as the reference viewing range by said reference viewing range determination unit.

3. The content reproduction apparatus according to claim 2, wherein said reference viewing range determination unit is configured to obtain information indicating priority for each of the plurality of acoustic effects, and determine, as the reference viewing range, the viewable range corresponding to the one of the plurality of acoustic effects that is either of highest priority or of lowest priority.

4. The content reproduction apparatus according to claim 1, further comprising an acceptance unit configured to accept information indicating a type of an acoustic effect selected by the first viewer, wherein said presentation control unit is configured to output the information that is based on the viewable range that is calculated by said viewable range calculation unit and corresponds to an acoustic effect indicated by the information accepted by said acceptance unit.

5. The content reproduction apparatus according to claim 1, wherein said viewable range calculation unit is configured to calculate the viewable range of the first viewer after excluding a predetermined peripheral range of the second viewer from the predetermined range.

6. The content reproduction apparatus according to claim 1, wherein said viewable range calculation unit is configured to calculate the viewable range of the first viewer by calculating only a predetermined peripheral range of the first viewer, which is included in the predetermined range.

7. The content reproduction apparatus according to claim 1, wherein said content display control unit is further configured to change a position or size of the first window and the second window, said sound output control unit is further configured to change at least part of a combination of the at least one speaker assigned for outputting the sound of the first content, when the position or size of the second window is changed, said viewable range calculation unit is further configured to newly calculate, when the position or size of the second window is changed, the viewable range of the first viewer, using the number and position of the speakers indicated by the combination changed by said sound output control unit, and said presentation control unit is further configured to present, to the first user, information that is based on the viewable range newly calculated by said viewable range calculation unit.

8. The content reproduction apparatus according to claim 1, wherein said presentation control unit is configured to present the information that is based on the viewable range to the first viewer, by outputting, to the display, text or an image indicating the viewable range, and to cause the display to display the text or image, the text or image being the information based on the viewable range.

9. The content reproduction apparatus according to claim 1, wherein said presentation control unit is configured to present the information that is based on the viewable range to the first viewer by outputting an instruction to illuminate the viewable range to an illumination apparatus connected to said content reproduction apparatus, and to cause the illumination apparatus to illuminate the viewable range, the instruction being the information based on the viewable range.

10. The content reproduction apparatus according to claim 1, wherein said presentation control unit is configured to output information indicating that the viewable range does not exist, when a result of the calculation performed by said viewable range calculation unit indicates that the predetermined range does not include the viewable range, the information indicating that the viewable range does not exist being the information based on the viewable range.

11. The content reproduction apparatus according to claim 1, further comprising a window displayable range determination unit configured to (a) determine, when assuming that the first viewer is located at a position within the viewable range, a range which is on the display and in which the first window is to be displayed to the first viewer, for each position within the viewable range, and (b) determine, as a window displayable range corresponding to the viewable range, a sum of ranges on the display that are determined, and said presentation control unit is configured to output information indicating the window displayable range determined by said window displayable range determination unit, the information indicating the window displayable range being the information based on the viewable range.

12. The content reproduction apparatus according to claim 1, further comprising a window displayable range determination unit configured to (a) determine, when assuming that the first viewer is located at a position within the viewable range, a range which is on the display and in which the first window is to be displayed to the first viewer, for each position within the viewable range, and (b) determine, as a window displayable range corresponding to the viewable range, a sum of ranges on the display that are determined, wherein said presentation control unit is configured to present the information that is based on the viewable range to the first viewer by causing the display to display at least part of the first window within the window displayable range determined by said window displayable range determination unit.

13. The content reproduction apparatus according to claim 1, further comprising a current viewing position determination unit configured to determine, using information for identifying the position of the first viewer, a viewing position that is a position at which the first viewer is located, the information being obtained from an external apparatus connected to said content reproduction apparatus, wherein said presentation control unit is configured to output the information that is based on both the viewable range and the viewing position that is determined by said current viewing position determination unit.

14. The content reproduction apparatus according to claim 13, wherein said current viewing position determination unit is configured to regularly determine the viewing position, using information regularly obtained from the external apparatus, and said presentation control unit is configured to output the information that is based on the viewable range, when a difference between a latest viewing position and a previous viewing position determined before the latest viewing position is equal to or above a predetermined threshold.

15. The content reproduction apparatus according to claim 13, wherein said presentation control unit is configured to determine whether or not the viewing position determined by said current viewing position determination unit falls within the viewable range, and to output the information that is based on the viewable range when the viewing position does not fall within the viewable range.

16. The content reproduction apparatus according to claim 15, wherein said presentation control unit is configured to output, when the viewing position does not fall within the viewable range, information regarding a direction in which the first viewer is to move so that the viewing position falls within the viewable range, the information regarding the direction in which the first viewer is to move being the information based on the viewable range.

17. A content reproduction method implemented by a content reproduction apparatus connected to a display and speakers, said content reproduction method comprising:

causing the display to display a first window for displaying video of first content to a first viewer and a second window for displaying video of second content to a second viewer;

causing, among the speakers, at least one speaker assigned to the first content to output sound of the first content;

causing, among the speakers, at least one speaker assigned to the second content to output sound of the second content;

calculating a viewable range, using (i) information indicating a size of a predetermined range, (ii) the number and a position of the at least one speaker assigned to the first content, and (iii) the number of channels required for a predetermined acoustic effect, the viewable range being included in the predetermined range and being a range in which the first viewer is located and can hear the sound of the first content with the predetermined acoustic effect included in at least one acoustic effect that is obtained from the first content and is available for reproducing the first content; and outputting information that is based on the calculated viewable range, so as to present the information to the first viewer.

18. A program which is recorded on a non-transitory computer-readable recording medium and which controls an operation of a content reproduction apparatus connected to a display and speakers, said program causing a computer to execute:

causing the display to display a first window for displaying video of first content to a first viewer and a second window for displaying video of second content to a second viewer;

causing, among the speakers, at least one speaker assigned to the first content to output sound of the first content;

causing, among the speakers, at least one speaker assigned to the second content to output sound of the second content;

calculating a viewable range, using (i) information indicating a size of a predetermined range, (ii) the number and a position of the at least one speaker assigned to the first content, and (iii) the number of channels required for a predetermined acoustic effect, the viewable range being included in the predetermined range and being a range in which the first viewer is located and can hear the sound of the first content with the predetermined acoustic effect included in at least one acoustic effect that is obtained from the first content and is available for reproducing the first content; and outputting information that is based on the calculated viewable range, so as to present the information to the first viewer.

* * * * *